(12) United States Patent
Griffin

(10) Patent No.: US 11,153,097 B1
(45) Date of Patent: Oct. 19, 2021

(54) SYSTEMS AND METHODS FOR DISTRIBUTED EXTENSIBLE BLOCKCHAIN STRUCTURES

(71) Applicant: Wells Fargo Bank, N.A., San Francisco, CA (US)

(72) Inventor: Phillip H. Griffin, Raleigh, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 361 days.

(21) Appl. No.: 16/247,270

(22) Filed: Jan. 14, 2019

Related U.S. Application Data

(60) Provisional application No. 62/637,315, filed on Mar. 1, 2018.

(51) Int. Cl.
| | |
|---|---|
| *H04L 29/06* | (2006.01) |
| *H04L 9/32* | (2006.01) |
| *H04L 9/08* | (2006.01) |

(52) U.S. Cl.
CPC .......... *H04L 9/3247* (2013.01); *H04L 9/3236* (2013.01); *H04L 9/0894* (2013.01); *H04L 9/3268* (2013.01); *H04L 2209/38* (2013.01); *H04L 2209/68* (2013.01)

(58) Field of Classification Search
None
See application file for complete search history.

(56) References Cited

U.S. PATENT DOCUMENTS

| | | | |
|---|---|---|---|
| 2003/0084298 A1* | 5/2003 | Messerges | H04L 9/3263 713/176 |
| 2015/0288512 A1* | 10/2015 | McGregor | H04L 9/0861 713/193 |
| 2017/0228731 A1* | 8/2017 | Sheng | G06Q 20/401 |
| 2017/0236123 A1* | 8/2017 | Ali | G06Q 20/3825 705/75 |
| 2017/0331635 A1* | 11/2017 | Barinov | H04L 9/3236 |
| 2017/0364701 A1* | 12/2017 | Struttmann | G06F 16/2282 |
| 2018/0150799 A1* | 5/2018 | Hunt | H04L 9/3297 |
| 2018/0150835 A1* | 5/2018 | Hunt | H04L 67/10 |
| 2018/0198794 A1* | 7/2018 | Huh | H04L 9/0637 |
| 2018/0373776 A1* | 12/2018 | Madisetti | H04L 9/3263 |
| 2019/0034465 A1* | 1/2019 | Shimamura | H04L 9/3239 |
| 2019/0132138 A1* | 5/2019 | Finlow-Bates | H04L 9/3236 |

(Continued)

OTHER PUBLICATIONS

Cryptographic Message Syntax—ASN.1 and XML, ANSI X9.73/2010, American National Standard for Financial Services, Apr. 15, 2010. 89 pages.

*Primary Examiner* — Maung T Lwin
(74) *Attorney, Agent, or Firm* — Foley & Lardner LLP

(57) ABSTRACT

A system, method, and apparatus for distributed extensible blockchain structures is provided. A system includes a parent blockchain. The parent blockchain includes a first block including first content, the first block stored at a first location, and a second block stored at a second location different than the first location. The second block includes second content and a first SignerInfo element. The first SignerInfo element includes a hash on the second content, a hash on the first content of the first block, a pointer to the first location of the first block, and a first SignatureValue element generated by digitally signing at least the hash on the second content, the hash on the first content, and the pointer to the first location.

31 Claims, 10 Drawing Sheets

(56) References Cited

U.S. PATENT DOCUMENTS

2019/0207766 A1\*  7/2019  Sanghvi ................ H04L 63/123
2019/0266650 A1\*  8/2019  Chapman .............. H04L 9/3247
2020/0234386 A1\*  7/2020  Blackman ............. H04L 9/0894

\* cited by examiner

SYSTEMS AND METHODS FOR DISTRIBUTED EXTENSIBLE BLOCKCHAIN STRUCTURES

CROSS-REFERENCE TO RELATED APPLICATION

This application claims priority to U.S. Provisional Patent Application No. 62/637,315, entitled "SYSTEMS AND METHODS FOR DISTRIBUTED EXTENSIBLE BLOCKCHAIN STRUCTURES," filed Mar. 1, 2018, and incorporated herein by reference in its entirety.

BACKGROUND

A distributed ledger, such as a blockchain, is a series of hash-linked, append-only, timestamped blocks, each block containing arbitrary data. When viewed as a linked-list data structure, a blockchain is a limited data "stack" whose operations only allow users to "push" blocks onto the top. Users are not allowed to modify blocks or to "pull" blocks off of the top. Each new block that is added is appended to the topmost block in the stack. A new block links back to the former top-of-stack block by including a hash (e.g., a smaller mathematical representation) of the preceding block in the new block and binding this hash to the new block under a digital signature.

SUMMARY

One embodiment relates to a system. The system includes a parent blockchain. The parent blockchain includes a first block including first content, the first block stored at a first location, and a second block stored at a second location different than the first location. The second block includes second content and a first SignerInfo element. The first SignerInfo element includes a hash on the second content, a hash on the first content of the first block, a pointer to the first location of the first block, and a first SignatureValue element generated by digitally signing at least the hash on the second content, the hash on the first content, and the pointer to the first location.

Another embodiment relates to a method. The method includes providing a parent blockchain, which includes providing a first block including first content, the first block stored at a first location, and providing a second block stored at a second location different than the first location. The second block includes second content and a first SignerInfo element. The first SignerInfo element includes a hash on the second content, a hash on the first content of the first block, a pointer to the first location of the first block, and a first SignatureValue element generated by digitally signing at least the hash on the second content, the hash on the first content, and the pointer to the first location.

Another embodiment relates to a system. The system includes a parent blockchain. The parent blockchain includes a first block including first content, the first block stored at a first location, and a second block stored at a second location different than the first location. The second block includes second content and a first SignerInfo element. The first SignerInfo element includes a hash on the second content, a hash on the first content of the first block, a pointer to the first location of the first block, and a first SignatureValue element generated by digitally signing at least the hash on the second content, the hash on the first content, and the pointer to the first location. The first block further includes a second SignerInfo element. The second SignerInfo element includes a hash on the first content of the first block, a hash on the second content of the second block, a pointer to the second location of the second block, the first SignerInfo element, and a second SignerInfo element generated by digitally signing at least the hash on the first content, the hash on the second content, the pointer to the second location, and the first SignerInfo element in the second SignerInfo element. The first and second blocks are each structured as a SignedData cryptographic message. The first and second blocks are each configured such that any number of external blockchains can be added or removed from at least one of the first block or the second block without invalidating the hashes on the first and second content.

DETAILED DESCRIPTION

Figure 1:
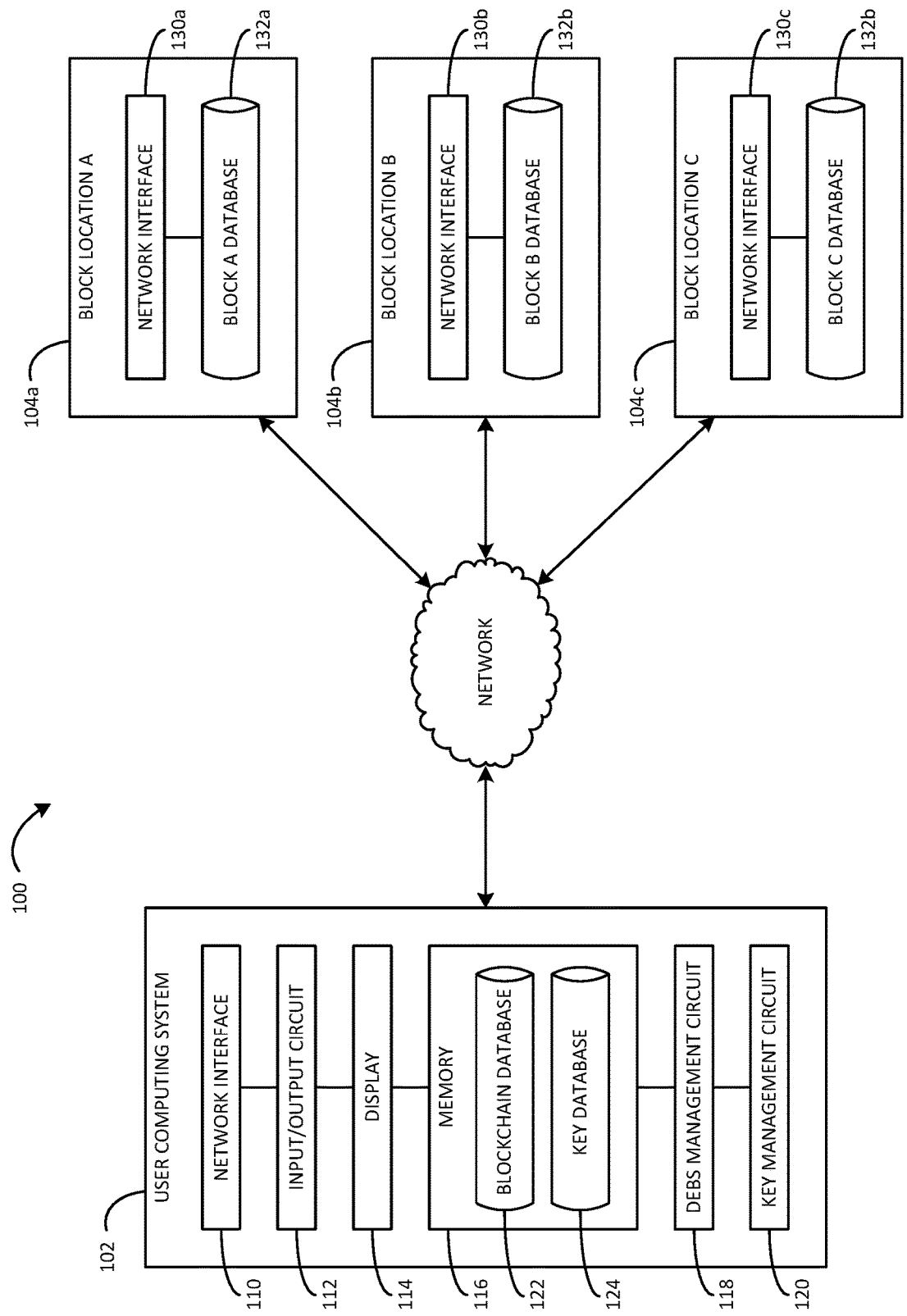
FIG. 1 is an environmental view of a system implementing a distributed extensible blockchain structure, according to one embodiment.

Referring to the figures generally, various systems, methods, and apparatuses for distributed extensible blockchain structures are described herein. An example implementation is described as follows. A system allows for the creation of a blockchain with a physically distributed structure. Accordingly, rather than the entire blockchain, including all of its blocks, being recorded on each replicated copy of the blockchain stored at each node, each block of this distributed extensible blockchain structure ("DEBS") may reside in a different physical location. Thus, to link together a series of globally distributed blocks to form the DEBS, each block added to the blockchain includes both (a) a hash of the preceding block and (b) one or more pointers to the location of the preceding block. Alternatively, or additionally, the DEBS may be implemented with a parent blockchain including blocks with pointers indicating the locations of external blockchains or sidechains linked back to the parent blockchain. Although the systems, methods, and apparatuses are described herein with reference to blockchains, it should be understood that the present systems, methods, and apparatuses may alternatively be used to implement a different type of distributed ledger system.

In various embodiments, blocks of the DEBS are implemented through cryptographic containers. To implement such containers, each party creating a block of the DEBS possesses a pair of cryptographic keys: a public key and a private key. For example, each key may be a very large prime number or related to a very large prime number. Each public/private key pair is selected such that a message encrypted with one of the keys can only be decrypted with the other key in the key pair. In general, a public key is made public (i.e., generally accessible and available to the public), while a private key is kept private to just the owner of the public/private key pair. Among other things, public/private key pairs may be used to "digitally sign" content. As an illustration, a party wanting to certify that a message has been created by the party may use a signing algorithm configured to, using the message and the party's private key, create a digital signature associated with the party. Further, in various arrangements, the owner of a key pair may have a digital certificate that includes information about the owner's public key and a digital signature of an entity (e.g., an issuing certificate authority) that has verified the certificate's contexts such that the owner may use the certificate to prove ownership of the public key. As such, the party's digital signature can subsequently be verified by a third party using a signature verifying algorithm with the message, the public key for the party, which the third party retrieves from the party's digital certificate, and the digital signature.

In various embodiments, DEBS may, for example, be implemented as a SignedData container (e.g., as defined in the American National Standards Institute ("ANSI") X9.73-2017 Cryptographic Message Syntax ("CMS")) consisting of message content and one or more digital signatures. For each signer, the SignedData container includes an identification of the certificate needed to verify the signer's signature, a set of signed attributes to be protected by the signature, the algorithm used to sign the signature, and an optional set of unsigned attributes. Accordingly, the signed-data container provides origin authenticity, data integrity, and (with appropriate additional measures such as auditing and accurate time-stamping), non-repudiation. As such, the SignedData container may implement DEBS through hash-linked and location-linked, timestamped blocks, each residing in a different physical location. Each block in the extensible SignedData container may be linked to any number of other external information objects or physical objects, such as tagged Internet of Things ("IoT") devices, data stores, or blockchains. External objects can be added to a "parent" block or removed at any time without affecting the data integrity or origin authenticity of the hash-linked parent blockchain.

The systems, methods, and apparatuses for providing DEBS offer several technical advantages over the prior art. With current blockchains and other distributed ledgers, each block must be replicated at each individual node. This can be visualized as each block residing in a given physical location. This limits the flexibility of the blockchain or other distributed ledger. For example, a party wishing to access any segment of the blockchain or add to the blockchain must typically download the entire blockchain, which can take large amounts of storage and time. By contrast, one technical advantage of the present systems, methods, and apparatuses for DEBS is that each block may reside in a separate physical location, which is accomplished by signing both the hash of the preceding block and a pointer to that block's location, providing the blockchain with much more flexibility in use. As an example, a party wishing to access a block of the DEBS may use the pointers to locate and download the individual block, thus saving the party time and improving the functioning of the computing system used by the party through the decreased storage and processing requirements needed to locate and download the block.

Additionally, current blockchains and other distributed ledgers allow for limited extensibility and incorporation of external structures, such as external blockchains. Moreover, making alterations to blockchains and other distributed ledgers must typically be done by adding a new block and cannot be performed by modifying an existing block. In comparison, another technical advantage of the present systems, methods, and apparatuses for providing DEBS is that any number of external blockchains to be added or removed from a block via the multiple signature container mechanism. This is accomplished by signing an additional value in a parent blockchain block that includes the hash of the external blockchain and a pointer to its location. For example, when the first external blockchain block is created as a SignedData type, it can contain the signed hash of the parent block and a pointer to the parent block. Thus, the parent blockchain and the external blockchain become cryptographically bound. As such, disbursed information and physical objects may be securely connected to a blockchain and benefit from distributed ledger technology. Furthermore, new external blockchains can be added to a block or removed from a block at any time without affecting the data integrity of the hash-linked block.

Furthermore, blockchains and other distributed ledgers typically have limited ability to provide for data privacy and confidentiality. Rather, unless the information on a block is specifically encrypted, the information on the block may be accessed by anyone with access to the blockchain (e.g., anyone running a node of the blockchain). Thus, yet another technical advantage of the present systems, methods, and apparatuses for DEBS is that an external block may be formed using a container employing additional cryptographic tools (e.g., SigncryptedData, where the data is protected using an algorithm that simultaneously signs and encrypts the data using the signers private/public key pair and the public key of a recipient), thereby providing for data confidentiality. In such embodiments, each external blockchain linked to a parent block can be managed using a different public/private key pair and certificate. Thus, ownership and management of external blockchains may be distributed to a set of stakeholders or business partners.

Referring now to FIG. 1, an environmental view of a system 100 implementing a DEBS is shown, according to an example embodiment. As shown, the system 100 includes a user computing system 102 and a number of block locations 104 (shown in FIG. 1 as block location A 104a, block location B 104b, and block location C 104c) connected by a network (e.g., network 106).

The user computing system 102 is associated with a user who or which is managing (e.g., adding, modifying, deleting, etc.) blocks and/or external blockchains of the DEBS. As such, a user may be an individual, a company, an organization, a blockchain management system, and so on. Accordingly, the user computing system 102 is any computing system that may be used to manage blocks and/or external blockchains of the DEBS, as described in further detail herein. For example, the user computing system 102 may include, but is not limited to, a stationary computing device (e.g., a desktop computer, a server system, etc.), a mobile computing device (e.g., a tablet computer, a laptop computer, a personal digital assistant, a phone such as a smartphone, etc.), a portable gaming device, a wearable computing device (e.g., a smart watch, smart glasses, a smart bracelet, etc.), and so on.

As shown in FIG. 1, the user computing system 102 includes a network interface 110, an input/output circuit 112, a display 114, a memory 116, a DEBS management circuit 118, and a key management circuit 120. The network interface 110 of the user computing system 102 is adapted for and configured to establish a communication session via the network 106 with the other components of the system 100. As used herein, a "network interface" may include any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), and a combination thereof (e.g., both a cellular transceiver and a Bluetooth transceiver).

The input/output circuit 112 is structured to receive and provide communication(s) to the user of the user computing system 102. In this regard, the input/output circuit 112 is structured to exchange data, communications, instructions, etc. with input/output components of the user computing system 102. As such, the input/output circuit 112 may include hardware and associated logics configured to enable the user computing system 102 to exchange information with the user. In certain embodiments, an input aspect of the input/output circuit 112 may allow the user to provide information to the user computing system 102, and an output aspect of the input/output circuit 112 may allow the user to receive information from the user computing system 102.

In various embodiments, the display 114 may be a screen, a touchscreen, a monitor, etc. The user computing system 102 may use the display 114 to communicate information to the user (e.g., by displaying the information to the user on the display 114) and/or to receive communications from the user (e.g., through a keyboard provided on a touchscreen of the display 114). In some embodiments, the display 114 may be incorporated as part of the input/output circuit 112, while in other embodiments, the display 114 may be separate from the input/output circuit 112.

As shown in FIG. 1, the memory 116 is communicably and operatively coupled with the other components of the user computing system 102. The memory includes a blockchain database 122 and a key database 124. The blockchain database 122 is configured to retrievably store information relating to the DEBS. For example, the blockchain database 122 may include blocks and/or external blockchains of the DEBS that are created by the user and physically stored on the user computing system 102. The key database 124 is configured to retrievably store information relating to the user's public/private key pair. As an example, the key database may store the user's private key and the user's certificate.

The DEBS management circuit 118 is configured to perform various management functions of blocks and/or external blockchains included in the DEBS. As an illustration, in various arrangements, the DEBS management circuit 118 is configured to add, modify, and delete blocks and/or external blockchains included in the DEBS, as further described herein (e.g., as discussed below with reference to FIG. 2). As described above, in various embodiments, the DEBS is implemented through SignedData or similar (e.g., SigncryptedData) containers. However, it should be understood that the DEBS may be implemented through any data type capable of hash-linking timestamped blocks that may reside in different physical locations.

The key management circuit 120 is configured to manage the public/private key pair for the user. For example, in some embodiments, the key management circuit 120 is configured to create a public/private key pair, ensure the generation of a certificate for the public key by a certifying authority, and retrievably store the public/private key pair and certificate in the key database 124. Alternatively, in some embodiments, the key management circuit 120 may be structured to communicate with an enterprise key management system that remotely generates and provisions public/private key pairs to the user computing system 102.

Additionally, the system 100 includes a number of block locations 104, shown in FIG. 1 as block location A 104a, block location B 104b, and block location C 104c. It should be understood, however, that while the system 100 includes three block locations, other embodiments of the system 100 may include fewer or greater numbers of block locations. Each block location 104 is associated with a physical location storing a block and/or external blockchain of the DEBS. As such, for example, each block location 104 is a database or data store, a database record number, a tagged IoT device, a computing system running another blockchain, and so on.

As shown in FIG. 1, each block location 104 includes a network interface 130 (shown in FIG. 1 as network interface 130a, network interface 130b, and network interface 103c) and a block database 132 (shown in FIG. 1 as block A database 132a, block B database 132b, and block C database 132c). However, those of skill in the art will appreciate that in various embodiments, each block location 104 may include additional components. For example, each block location 104 may be structured similarly to the user computing system 102 and further include an input/output circuit and a display.

Each network interface 130 is adapted for and configured to establish a communication session via the network 106 with the other components of the system 100. Additionally, each block database 132 is configured to retrievably store one or more blocks and/or one or more external blockchains associated with the DEBS, as described in further detail below. Alternatively, each block database 132 is configured to retrievably store part of one or more blocks and/or part of one or more external blockchains associated with the DEBS, as described in further detail below.

As discussed above, a DEBS may be implemented as a series of blocks located in different physical locations. Alternatively, or additionally, a DEBS may be implemented as a series of blocks in a blockchain (e.g., a parent blockchain) that point to external objects (e.g., external blockchains or sidechains, external database records, etc.) located in different physical locations. Accordingly, in various embodiments, each given block n of a DEBS includes a paired hash and pointer set, where the hash indicates the previous block and the pointer indicates the next block or associated external object. A relying party may use the paired hash and pointer set to gain data integrity assurance that the block located by this included hash-pointer-set pair (e.g., block n−1) is the correct preceding block in the blockchain. Further assurance can be gained that the content of this preceding block has not been modified by verification of a signed hash. These pointer values included in a block may vary by application, as described in further detail below.

In various arrangements, the blocks or components thereof of a parent blockchain and/or an external blockchain are implemented through SignedData containers. Accordingly, referring now to FIG. 2, a block diagram of an example block 200 (shown in FIG. 2 as "block N") of a DEBS parent blockchain is shown, according to an example embodiment. The implementation of DEBS is described herein with reference to the SignedData block 200 shown in FIG. 2, though it should be understood that in other arrangements, a DEBS may be implemented through a different container capable of the same uses described herein.

As shown, the block 200 includes content 202. Content 202 may include a header and a list of transactions or other data. Additionally, the block 200 contains a first value 204

Figure 2:
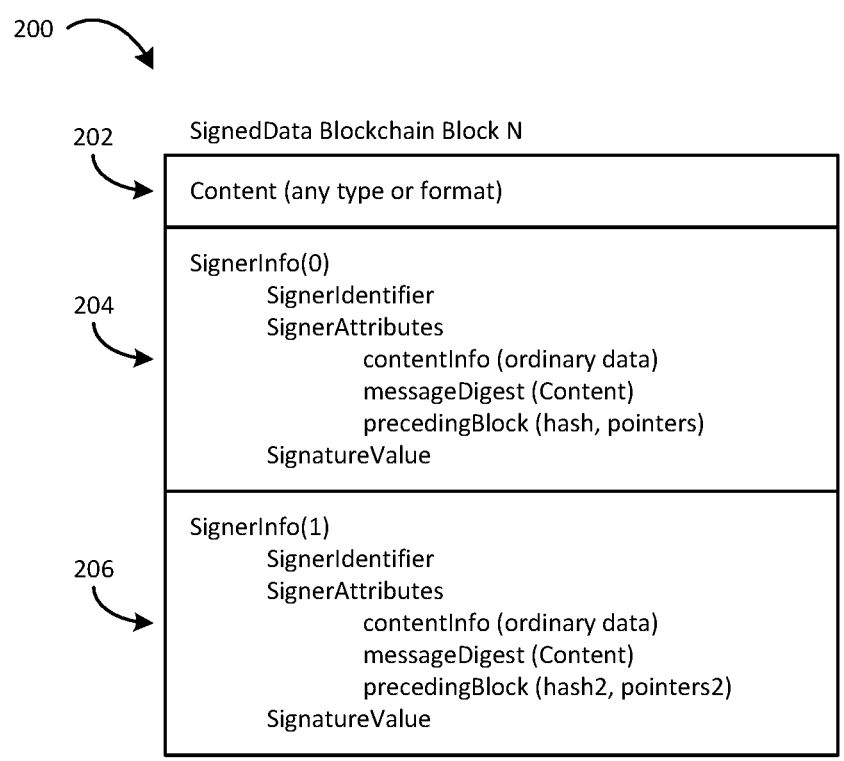
FIG. 2 is a block diagram of a typical block in a distributed extensible blockchain structure, according to one embodiment.

(shown in FIG. 2 as "SignerInfo(0)") associated with a first public/private key pair. Signerinfo(0) holds the signature on a message digest (e.g., a cryptographic hash function containing a string of digits created by a one-way hashing formula, shown in FIG. 2 as "messageDigest(Content)" element) of the content 202 (included in Signerinfo(0) as "contentInfo(ordinary data)" element) in the block 200. The content 202 value is thus indirectly signed by signing the message digest of the content. Moreover, the messageDigest element may also include the algorithm used to create the hash, with the hash algorithm cryptographically bound to the hash of the content 202 by the signer. Doing this, for example, follows the signature process used in secure email applications that use SignedData. Each block of a blockchain may further include a different hash and signature algorithm. This feature provides "cryptographic resiliency," allowing the algorithm to be changed over time as needed to meet evolving security policy requirements or evolving threats (e.g., quantum computing, new cyber-attacks, discovered weaknesses, etc.).

Alternatively, in some embodiments, the content 202 may be detached (e.g., kept separate) from the digital signature. This may be desirable, for example, when the amount of data to be stored in the content 202 of the block 200 is large or has a confidentiality requirement. Alternatively, detaching the content 202 makes it possible to use a SignedData container to manage multiple distributed ledger technology vender products, as each block may contain the detached content represented as the hash of an R3 Corda, IBM Hyperledger Fabric, Ethereum, or other vender's blockchain block. Accordingly, a hash of the content 202 may be generated and signed, and the content 202 may be detached. To ensure that the content 202 may be located during signature verification, as the signed hash would need to be recomputed, in such circumstances the Signerinfo(0) may further include a new signed attribute (e.g., termed "contentLocation") may be defined to facilitate this process. This attribute would have information pointing to the location of the content 202 (e.g., a URI configured to locate the content 202 anywhere on the Internet, an RFID, a database and record number, etc.) as its payload. The attribute would also be bound to the other signed attributes of the SignerInfo (e.g., contentType and messageDigest attributes). However, if instead all relying parties were aware of the location of the detached content 202, the new attribute could be omitted as unnecessary.

As shown in FIG. 2, also included in the Signerinfo(0) is the hash of the content in the preceding block (now shown) of the parent blockchain paired with any pointers to that preceding block (shown in FIG. 2 as "precedingBlock(hash, pointers)" element). For example, a block location pointer may be a Uniform Resource Identifier ("URI") pointer or file (e.g., a Uniform Resource Locator ("URL") that corresponds to the location of the block), a database record number, a geographic point represented as the International Organization of Standardization ("ISO") 6709 coordinates of a location (i.e., including latitude, longitude, and altitude), and so on. A given pointer may directly or indirectly locate a block (e.g., may point to the location of the block directly or point to another location, such as a database, from which the location of the block may be determined). Moreover, a given pointer may provide described information, such as a unique bank or branch identification number that gives context to a fully qualified URI file name pointer. Accordingly, referring back to FIG. 1, a block with a pointer pointing to block A indicates that block A is stored in the block A database 132a of block location A 104a, a pointer pointing to block B indicates that block B is stored in the block B database 132b of block location B 104a, and a pointer pointing to block C indicates that block C is stored in block C database 132c of the block location C 104c.

Similarly, a hash may be used to identify the location of block preceding block 200 (e.g., block N−1). For example, referring back to FIG. 1, assuming that an example DEBS includes block A, block B, and block C in sequential order, block B would include a hash indicating that block A stored in the block A database 132a and a pointer indicating that block C is stored in the block C database 132c. Alternatively, rather being stored in physically separate locations, in some embodiments, the blocks of a DEBS may be stored sequentially in a single location. In such embodiments, the block 200 may not include a hash because the location of the preceding block would be known based on the sequential order (e.g., by being stored in a flat file and rows in a database).

As an illustration of these concepts, in an information system, a pointer may be in the form of a URI. As another illustration, for locations in a physical system, a tuple of {x, y, z} coordinates may be used to indicate the location of the next block in a warehouse location (e.g., row, aisle, shelf) or a physical object located in the IoT. For example, the pointer may include global positioning system ("GPS") coordinates identifying a location in which a Cloud service is storing the data for a block such that a party may verify that the data is not being stored in a location where laws or regulations would prohibit the storage of that data. For physical objects, the hash may be a hash of a unique RFID identified or a hash of data stored on a tagged object (e.g., an IoT object). A pointer may also support a series of locator values 1 to N, such as values of different pointer types, of granular location information. As an example, a pointer may include a first value that is a URI identifying the location of a warehouse on the internet, a second value that is a building number or mailing address of the warehouse, a third value that is a tuple of {x, y, z} identifying a location within the warehouse, and a fourth value that is an RFID identifying a specific item at the location.

A set of attributes to be protected by a signature (shown in FIG. 2 as "SignedAttributes" element) are signed, and the result is a "SignatureValue." As an example, one of the SignedAttributes may be a timestamp for the block 200. The timestamp may be bound to the block 200 based on either a local time source or a trusted time stamp (e.g., a signed X9.95 timestamp token). Alternatively, a timestamp may be implemented as an unsigned attribute (not shown in FIG. 2). The "SignerIdentifier" of Signerinfo(0) is used to identify the public key needed to verify the signature. The SignerIdentifier may be the hash of a public key certificate, simply the public key of the signer when pseudo anonymity is desired, or another identifier of the signer public-private key pair. Further, in some embodiments, the SignerIdentifier element may include an identifier of the signature algorithm used.

The block 204 also contains a second value 206 (shown in FIG. 2 as "SignerInfo(1)") similar to Signerinfo(0) but associated with a second public/private key pair. The SignerInfo(1) value contains the same contentInfo attribute value as in Signerinfo(0). However, while both of Signerinfo(0) and SignerInfo(1) contain a messageDigest attribute that contains the digest of the content 202, each signer is free to use a different digest algorithm and signature algorithm.

Additionally, in the example of FIG. 2, SignerInfo(1) contains a pair of hash and pointer values (shown in FIG. 2 as "hash2" and "pointers2") that link and identify an associated blockchain. In practice, the signer of SignerInfo(1) first creates a SignedData message that first serves as the first block in the associated blockchain and includes in that first associated blockchain block a preceding block attribute that points back to the parent blockchain's block (e.g., block N). The message digest of the content in that first block in the associated blockchain is the value used as "hash2" in Signerinfo(1). This effectively doubly-links the parent and associated blockchains.

Alternatively, in some embodiments, instead of Signerinfo(1) pointing to the first block of an associated blockchain, Signerinfo(1) points to and identifies any block in any blockchain. In such embodiments, hash2 is a hash of the identified block and pointer2 is a pointer to the block. In some arrangements, the identified block may still include a pointer back to block N in the parent blockchain. Further, it should be understood that rather than pointing to an associated blockchain, Signerinfo(1) may instead point to an object on the IoT, to a database record, etc.

Moreover, in some arrangements, a unique object identifier may be used as the attribute names of each "linking" attribute type discussed above (e.g., "pointer2") so that tools may be used to identify, based on the name, the type of object expected at the end of a given pointer. As an example, unique object identifiers may be named for a preceding block (e.g., "precedingBlock" element), for an associated blockchain (e.g., "associatedBlockchain" element), associated IoT (e.g., "associatedIOT" element), associated external database (e.g., "externalDatabase" element), and so on.

As a use case, a DEBS created from a series of SignedData blocks 200 termed "SDn", with n being the number of the given block on the DEBS, where each block 200 includes a hash termed "hash( )" and a URI pointer termed "uri( )" may be modeled as follows:

SD1 {hash( ) uri( )}<=SD2 {Hash(SD1), uri(SD1)}<=SD3 {Hash(SD2), uri(SD2)}

As shown, each hash indicates the prior block and each URI indicates the following block such that a user with a given block may identify the block's relative location on the DEBS. Each SDn block may contain an arbitrary content of any type or format, as well as any type or format of signed or unsigned attributes. Moreover, each SDn block may contain a signed attribute that points to the first node of an external object such as an arbitrary data structure of any type, such as another blockchain, the head of a doubly linked list, or the root node of a binary search tree.

As a more concrete example, a DEBS may include blocks representing some asset, such as a house, a car, or a stock. Each new asset that is acquired can be appended to an asset-blockchain, along with a pointer to the first block of an asset-ownership-blockchain. Initially, the asset-ownership-blockchain is created to identify the first owner of the asset, along with descriptive information about the asset (e.g., price, type, location, etc.). When the asset identified in the asset-blockchain changes over time (e.g., taxes are levied, dividends are earned, etc.), new blocks may be added to the asset-ownership-blockchain of the first owner by appending a SignedData block to the top of the asset-ownership blockchain that points to the preceding block. When ownership of the asset is transferred to a new owner, a new SignedData SignerInfo value may be added to the asset-blockchain that points to a new external asset-ownership-blockchain specific to the new owner. Over time, the blocks on the asset-blockchain may point to several external asset-ownership-blockchains as ownership of the asset changes.

Accordingly, referring back to FIG. 1, if the user wishes to create a new block for the DEBS, the DEBS management circuit 118 is configured to create a new SignedData block 200. In doing so, the DEBS management circuit 118 is configured to generate the first value 204 for the new SignedData block 200 with a hash pointing back to the previous end-of-chain SignedData block 200. Additionally, the DEBS management circuit 118 is configured to generate the second value 206 for the previous end-of-chain SignedData block 200 with a pointer pointing to the new SignedData block 200. Rather than creating a new block, the user may further create an external blockchain with a hash that points back to the SignedData block 200 and generate the second value 206 with a pointer pointing to the external blockchain, as discussed above. Alternatively, if the user wishes to point to an external object, such as an external blockchain, from an existing block 200, the DEBS management circuit 118 may add an additional SignedData value to the existing block 200 with a pointer pointing to the external object (e.g., the first block of a new external blockchain). In this way, the DEBS management circuit 118 is configured to doubly link the two blockchains.

While FIG. 2 only includes a first value 204 associated with a first public/private key pair and a second value 206 associated with a second public/private key pair, each SignedData block 200 may include any number of values associated with various signers. This is due to the fact that any number of SignerInfo values may be added to the block 200 at any time, and any number of SignerInfo values may be deleted from any block 200 without affecting the SignerInfo(0) signature so long as the content 202 is not modified. The ability to add and remove SignerInfo values allows multiple parties to sign the content with their own private key component of a public/private key pair. As such, while no signer may change the content, hash, or signature of another signer, the set of signed attributes, algorithms, and keys may vary for each signer. Each signer thus provides at least a public key identifier (e.g., in the SignerIdentifier element), a signature algorithm (e.g., in the SignerIdentifier element or in another element of the SignerInfo element), a set of attributes to be signed (e.g., in the SignedAttributes value), and a signer signature on the attributes (e.g., in the SignedValue element). Each SignerInfo may further contain different sets of signed or unsigned attributes, and a signer-key-identifier field indicates the public key or public key certificate needed by a relying party to verify that specific signature. Accordingly, this capability of having complex hash-linked data structures with multiple signer information fields may support migration from current cryptographic algorithms to quantum-safe solutions.

Additionally, SignerInfo values could be added or removed from the DEBS without detection, as there is ordinarily no cryptographic binding of the SignerInfo values under a signature. In additional to allowing the DEBS to cope with change in the blockchain over time, in certain embodiments, this feature may allow a user to create a block whose SignerInfo(0) includes hash-links to future associated blockchains (e.g., future external blockchains). In such embodiments, an indication of the number of expected associated blockchains may be included, or an upper limit on the number of expected associated blockchains that may be incorporated in a SignerInfo value. For example, rather than including a single hash and pointer set, Signerinfo(0) may include hash and pointer sets corresponding to the preceding block and the number of expected associated blockchains. Further, Signerinfo(0) may be configured to include one attribute for the preceding block (e.g., termed "precedingBlock") and attributes corresponding to the number of expected associated blockchains (e.g., termed "sideChain1,"

"sideChain2," etc.), which would require creating a root block for each sidechain such that the locations and hashes of each sidechain were known. In some versions, Signerinfo (0) may be further configured to include an attribute placing a limit on the number of sidechains allowed. The payload for this attribute may be, e.g., a single integer or a pair of integer values (e.g., {min., max.}). In such arrangements, checking that the payload for this attribute is not violated would become part of the block integrity verification process.

As such, in some embodiments, a user (e.g., the user associated with the user computing system 102) may cryptographically bind the two SignerInfo values shown in block 200 to ensure that additions or deletions of SignerInfo values can be detected. For example, the user, who may be a relying party such as a blockchain service provider or owner, may create a "detached" SignedData message that signs all of the message digests in block N. However, in order to later add a new SignerInfo value or remove a SignerInfo value, this detached signature would need to be recreated. As another example, block N may be wrapped in a signature to protect its data integrity.

Alternatively, there may be only one signer for all of the SignerInfo values. The signer may use the same public/private key pair to sign each of the SignerInfo values, or the signer may manage security risk by using more than one key pair and associated public key certificate. As yet another alternative, multiple parties may each create their own external blockchain, all of which are tied to a specific parent block. As an example, external blockchains tied to a parent but under control of different stakeholders may build external blocks using the SigncryptedData message type instead of using the SignedData message type, thereby providing them with the additional benefit of data confidentiality.

It should also be understood that additional information may be included in each of the SignedInfo values of a given SignedData block 200 that may be used in implementing a DEBS. As an example, in some embodiments, an unsigned attributes field may be added to any SignerInfo value (e.g., information that has been previously signed external to the SignedData message) in any block 200 at any time without affecting signature processing. As such, adding an unsigned attributes field allows any content of any format or type to be carried along in the SignedData block 200 on a per-SignerInfo basis without that content participating in the SignedData block 200 signature processing. Thus, this content may be changed at any time without impacting the hash or signature of the block 200. To illustrate this, content signed by any signer may be carried in an unsigned attributes field, including content signed by those who are not message senders or recipients, such as auditors. Accordingly, unsigned attributes may be included and customized on a per-recipient basis when there is more than one signer information field (e.g., SignerInfo). Unsigned attributed may be added or removed from a SignedData block 200 without impact on signature verification by simply re-encoding the message when definite-length encoding is used or by simply adding to or removing the content when indefinite-length encoding is used without re-encoding. Moreover, in addition to unsigned attributes, each SignerInfo value may identify its own signing key, digest algorithm, and/or signature algorithm.

Additionally, in some embodiments, while the blocks of the DEBS may be located in different physical locations, a copy of the DEBS or a list of the hashes/pointers may be stored in a single location (e.g., a cloud computing system storing the entire DEBS). For example, this may be beneficial in case one of the blocks is lost or moved. In that circumstance, the blockchain may be restored from the copy, or the break in the blockchain may be identified from the list of hashes/pointers. As an example, a business may implement a DEBS with the entire blockchain stored in the cloud but with individual blocks downloadable locally as copies.

In addition, in some embodiments, the block 200 may include a third SignerInfo value that hash-links only the transactions of interest from the preceding block, such as all of the transactions from a certain sending party. Accordingly, if the signed hash in SignerInfo(0) pointing to the preceding block subsequently could not be verified to be valid (e.g., because someone had modified data in the preceding block or changed the signature or hash), the third SignerInfo value including the hash-linked transactions of interest would allow a party to determine whether any of the transactions of interest in the preceding block had been modified. Furthermore, in certain embodiments, a manifest of the transactions of interest may be created with one manifest entry, e.g., per business partner of the sending party. A hash may then be created for each entry, and the set of hashes may be signed in a fourth SignerInfo value in the block 200. As such, if the signature on the pointed-to block could not be verified, the fourth SignerInfo value would allow a party to determine which, if any, of the transactions of interest had been modified and for which business partners. In this way, trust may be maintained in a subset of the preceding block (e.g., because all of the transactions of interest for a certain business partner may be verified using the third and fourth SignerInfo values) even when the preceding block as a whole becomes corrupted.

It should also be understood that the elements and attributes shown as part of the block 200 in FIG. 2 are intended to be exemplary. In other embodiments, the block 200 may include fewer or additional elements and/or attributes. For example, the block 200 may include a timestamp attribute used to identify the timestamp(s) of the one or more signatures included in the block 200. Additionally, contentType and messageDigest attributes must be included in SignedData whenever signed attributes are included (e.g., because the contentType and messageDigest attributes are required by the CMS). Further, timestamp and precedingBlock attributes may be necessary to include as basic requirements to form a blockchain. However, aside from these attributes, each signer of the content in a SignedData container can include under their signature any number of attributes for any purpose in any type or format. For example, a signer may include the contentLocation attribute such that the SignedData content may be detached from the container (e.g., so that the content may be stored at a different location from the container and restricted by access and other security controls). As another example, a signed may include a containerLocation attribute (e.g., implemented as the pointer in a precedingBlock attribute) that allows each preceding block to be stored, for example, anywhere on the Internet.

Figure 3:
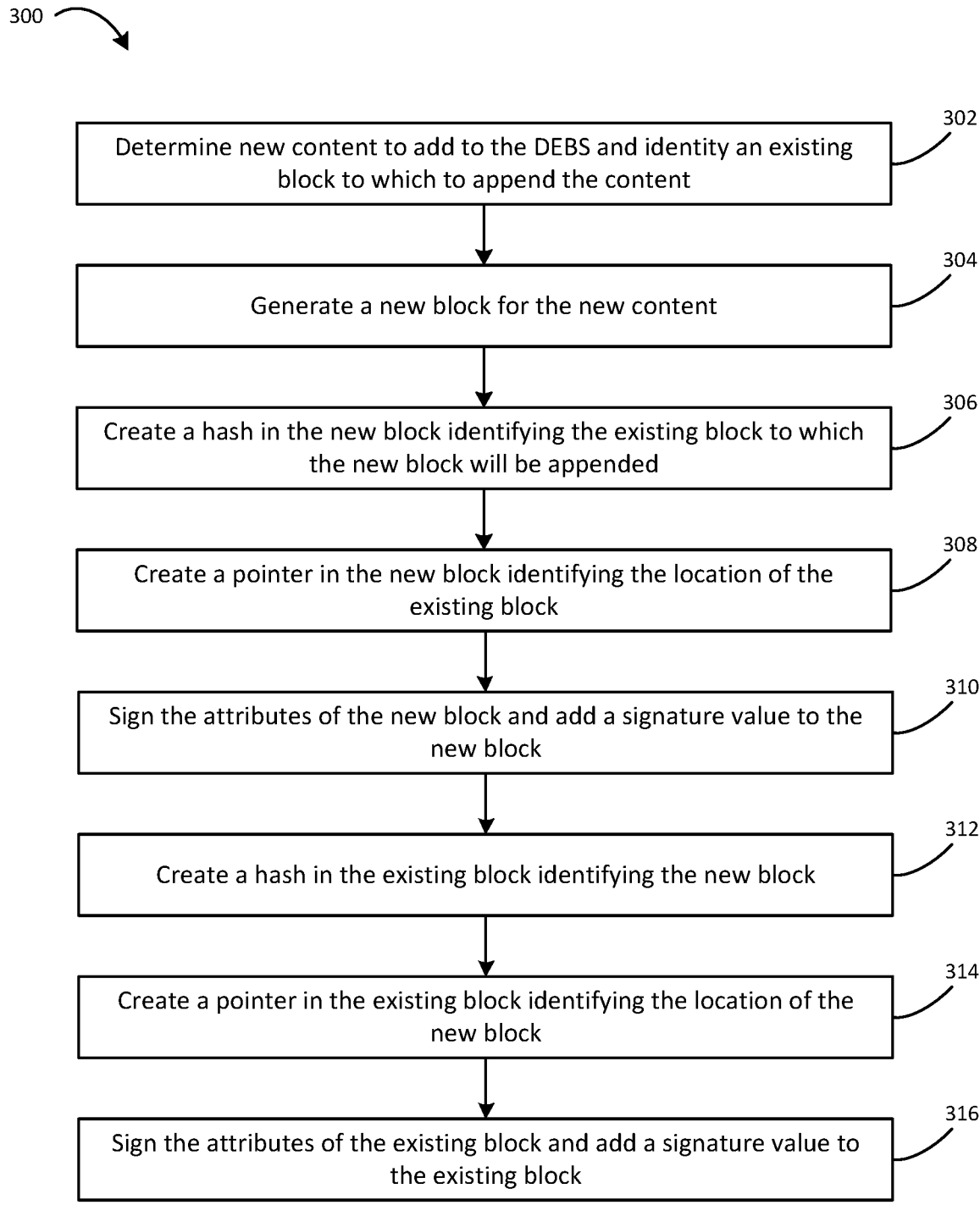
FIG. 3 is a flow diagram showing a process of adding a new block to a distributed extensible blockchain structure, according to one embodiment.

Referring now to FIG. 3, a flow diagram of a method 300 of adding a new block to an existing DEBS is shown, according to an example embodiment. At step 302, new content to be added to the DEBS is determined and an existing block to append the new content to is identified. For example, the new content may include content to be added to a parent blockchain of the DEBS, content to be added to an existing sidechain of the DEBs, or content to be added as a new sidechain to the DEBS. Accordingly, the existing block to which the new content will be appended may be a parent block, an existing sidechain block, and a block of a new sidechain created to store a number of new content items.

At step 304, a new block is generated for the content. For example, the new block may include a SignedData block container similar to the block 200 shown in FIG. 2, or the new block may be generated as a different cryptographic container (e.g., SigncryptedData). Alternatively, in some embodiments, the content may not be implemented into a new block but instead stored in a location capable of being identified, such as in a database or an IoT object. In various embodiments, a hash of the content of the new block is computed and added to the attributes of the new block (e.g., the SignedData attributes).

At step 306, a hash identifying the existing block to which the new block will be appended is created in the new block (e.g., the new block is created with or amended to include a new SignerInfo value with a hash and a pointer for the new block). In some embodiments, the hash is fetched or computed with a hash algorithm implemented throughout the DEBS that produces a hash from the content of the existing block (e.g., from the content 202 stored in the block 200). Thus, in certain arrangements, the hash may be the same as the message digest of the content of the existing block, thereby double-linking the existing block and the new block. If, for example, the new block is a SignedData message, the hash may then be included in the list of signed attributes for the SignerInfo value for the new block and may be signed using a signing algorithm and the user's private key. Alternatively, in embodiments where the content is not implemented as a new block, no hash may be implemented, or a hash may be implemented and stored along with the new content (e.g., the hash of the existing block may be stored in an external database in association with the new content).

At step 308, a pointer identifying the location of the existing block is created in the new block. For example, the pointer may be a URI, a database record number, geographic coordinates, and so on that indicates where the existing block is stored. As an illustration, the existing block may be a block of a parent blockchain that is stored in cloud server. Accordingly, the pointer may be a record number identifying the location of the cloud server and the block within the server. If the new block is a SignedData message, the pointer may be included in the list of signed attributes for the Signerinfo value for the new block and may be subsequently signed using a signing algorithm and the user's private key. Alternatively, in embodiments where the content is not implemented as a new block, no pointer may be implemented, or a pointer may be implemented and stored along with the new content and/or a hash of the existing block. Moreover, in some embodiments, the new block may not include a hash or a pointer to the existing block, with the user adding the new content to the DEBS instead relying on the fact that the existing block will identify the new content through a Signerinfo value created for the new block (e.g., as discussed below with reference to steps 310 and 312). Alternatively, in some embodiments, additional attributes are added to the new block, such as a timestamp attribute.

At step 310, the attributes of the new block are signed (e.g., using a private key of the signer). Accordingly, in various embodiments, a hash of the content of the new block, the hash identifying the existing block, and the pointer identifying the location of the existing block are all signed. A signature value is then added to the new block that includes the signed attributes. The result is a new top block in the blockchain that binds the hash of the content of the new block to the hash of the content of the preceding block under the signer's signature.

In some arrangements, nothing further is needed to create the DEBS. However, in other arrangements, and in the method 300, the existing block is further modified to doubly link the new block and the existing block together. Accordingly, at step 312, a hash identifying the new block is created in the existing block (e.g., the existing SignedData block container is amended to include a new SignerInfo value with a hash and a pointer for the new block). In some embodiments, the hash is computed similarly to the hash computed at step 306 (e.g., using an algorithm implemented throughout the DEBS that produces a hash from the content of the new block). In other embodiment, the hash is computed differently from the hash computed at step 306. For example, the hash may be computed using an algorithm that is unique to the signer appending the new block. In certain arrangements, the hash may be the same as a message digest of the new content in the new block, effectively double-linking the existing block and the new block. Additionally, in various embodiments, a hash of the content of the existing block is computed or fetched and added to the attributes of, for example, the new SignerInfo value of the existing SignedData block container.

At step 314, a pointer indicating the location of the new block is created in the existing block. As an example, the pointer may be a URI, a database record number, geographic coordinates, and so on. Alternatively, the pointer may indicate the location of the stored new content if the new content is not included in a new block. The pointer may be of the same type as the pointer created at step 308, or the pointer may be a different type. To illustrate, the pointer may be based on the content of the new block in contrast with the content of the existing block. For example, if the new content is a physical item stored in a warehouse, and the content of the existing block is part of a ledger associated with the warehouse, the pointer for the new content may be the physical location of the physical item (e.g., as represented in geographic coordinates) while the pointer for the existing block may be a database record number identifying the virtual location of the existing block. Similar to the pointer created at step 308, if the existing block is a SignedData message, the pointer may be included in the list of signed attributes for the SignerInfo value for the new block or new external object and subsequently signed using a signing algorithm and the user's private key. However, in some embodiments, the existing block may not include a hash or a pointer to the new block, with the user adding the new content to the DEBS instead relying on the fact that the new block will identify existing block with which the new content is associated through a SignerInfo value created in the new block (e.g., as discussed above with reference to steps 306 and 308). Alternatively, in some embodiments, additional attributes are added to the existing block (e.g., to the new SignerInfo value), such as a timestamp attribute.

At step 316, the attributes of the existing block are signed (e.g., using a private key of the signer). For example, a hash of the content of the existing block, the hash identifying the new block, and the pointer identifying the location of the new block that are included in the new SignerInfo value for the new block are all signed. A signature value is then added to the new SignerInfo value in the existing block that includes the signed attributes. The result is that the new block and the existing block are doubly linked together through the signed hash of the content of the existing block and the hash of the content of the new block.

However, it should be understood that method 300 is an exemplary method of adding a new block to an existing DEBS. In other embodiments, a first SignedData container ("SignedData A") may be hash-linked to a preceding SignedData container ("SignedData B") differently than depicted in method 300. In one arrangement, SignedData A is hash-linked to SignedData B by the creator of SignedData A signing the hash of the SignedData B (e.g., stored under the SignatureValue element of SignedData B). Hash-linking the blocks in this manner would negate the ability to add future SignerInfo values but may be useful for simple DEBS implementations. In a second arrangement, SignedData A is hash-linked to SignedData B by the creator of SignedData A signing the entire Signerinfo(0) value of SignedData B, which would include under the hash-link all signed attributes in SignedData B as well as the signature and key identifier of the signer of Signerinfo(0). In a third arrangement, SignedData A and SignedData B are hash-linked by the creator of SignedData A signing the SignedAttributes element in Signerinfo(0) of SignedData B. This approach would be efficient, as these attribute must already be signed, and the process of signing these attributes encodes them into an unambiguous octet string before inputting the string into a signature function. This is the same format that would be used to input that data to a hash function, so additional code would not be necessary to encode the attributes into an unambiguous octet string. Further, this approach would include not only the hash of the preceding content in the hash-link, but also the hash of the content that precedes the preceding block.

Additionally, multiple SignedData containers may be hash-linked together as discussed above. For example, SignedData A may be hash-linked to preceding block SignedData B via a first SignerInfo value (e.g., SignerInfo (0)) in SignedData A and hash-linked to a third SignedData container ("SignedData C"), such as a subsequent SignedData container in the blockchain or a SignedData container in an associated blockchain, via a second SignerInfo value (e.g., Signerinfo(1)) in SignedData A. Alternatively, rather than hash-linking SignedData containers using multiple SignerInfo values, in a fourth arrangement, SignedData containers may be hash-linked using a "signerinfo" attribute within a SignerInfo type. The signerinfo attribute is a pair of values: an object ID ("OID") titled "signerinfo" and a ASN.1 Type payload that is a SignerInfo type. As an illustration, SignedData A may include a SignerInfo(0) value that includes a hash on the content of SignedData B, a hash on the content of SignedData A, a pointer to the location of SignedData B, and a SignatureValue element generated by digitally signing the hashes and the pointer. The SignerInfo (0) value may further include a signerinfo attribute with a payload in the form of a second SignerInfo type, including a hash on the content of SignedData C, a hash on the content of SignedData A, a pointer to the location of SignedData C, and a SignatureValue element generated by digitally signing the hashes and the pointer. In this way, SignedData A may be hash-linked to both SignedData B and SignedData C through a single SignerInfo(0) value within SignedData A. Alternately, the signerinfo attribute may include a payload of SignerInfo(0) to create another hash-link between SignedData A and SignedData B, as discussed in further detail below. Further, signerinfo attributes may be nested forever within another SignerInfo type, allowing SignedData A to be hash-linked to multiple SignedData containers through a single SignerInfo(0) value. As another alternative, SignerInfo A may instead include a "signerinfos" attribute configured similarly to the signerinfo attribute but with a payload of type Signerinfos, which is a series of one or more values of type SignerInfo.

Furthermore, still other embodiments of hash-linking SignedData A to SignedData B may be implemented to account for quantum computing threats. In a fifth arrangement, SignedData A and SignedData B are hash-linked by implementing a Signerinfo(0) value in SignedData A, as described above in method 300, using conventional cryptography such as Rivest-Shamir-Adleman ("RSA") or Elliptic Curve Digital Signature Algorithm ("ECDSA") signatures. However, SignedData A and SignedData B are further hash-linked by implementing a Signerinfo(1) value in SignedData A that is similar to Signerinfo(0) but which leverages a quantum-safe signature algorithm. Thus, users would have two ways to walk the hash-linked chain: one using conventional cryptography (Signerinfo(0)) and the other using quantum-safe cryptography (Signerinfo(1)). All that users of the blockchain would need to be capable of at present is the conventional path through the Signerinfo(0) value; the Signerinfo(1) value would provide a failsafe path if the conventional cryptography were compromised. Thus, both the Signerinfo(0) and Signerinfo(1) values would protect the integrity and origin authenticity of the hash on the content of the block. Alternatively, in a sixth arrangement, rather than including both Signerinfo(0) and Signerinfo(1) values, a user could doubly sign Signerinfo(0) by including in the SignedAttributes element of Signerinfo(0) a signerinfo attribute that contained as its payload a quantum algorithm-signed SignerInfo value. In this way, SignedData A would include only a single SignerInfo value, but the Signerinfo(0) value would contain a signed attribute that offered some quantum safety.

Further, either the single SignerInfo value or the two SignerInfo values approach could be used to facilitate migrating from one signature algorithm to the next. For example, changing from using RSA to using ECDSA or Edwards-curve Digital Signature Algorithm ("EdDSA") would be handled in similar ways using either the single SignerInfo value or two SignerInfo values approach. Using the two SignerInfo values approach as an illustration, the user could go back to blocks that were hash-linked prior to the adoption of the new algorithm and add a second SignerInfo value for the new algorithm (e.g., add a Signerinfo(1) value). For extra security, when adding the new second SignerInfo value to a block, the user could include in its SignedAttributes element a signerinfo attribute encapsulated the old algorithm's signature. Thus, as an example, the user could initially sign the Signerinfo(0) of a block with an RSA-2048 bit scheme and later create and sign a Signerinfo (1) value in the block with an RSA-4096 scheme that encapsulates the Signerinfo(0) value as a signerinfo attribute within the new Signerinfo(1) value.

Figure 4:
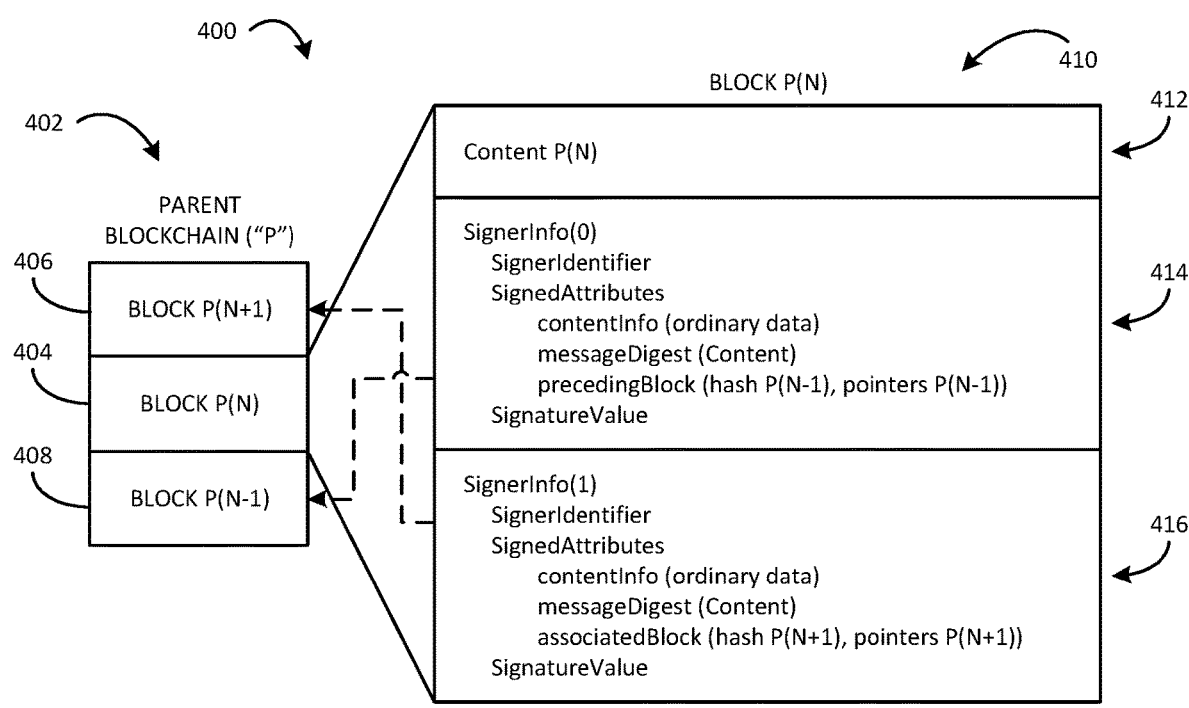
FIGS. 4 and 5 are block diagrams of distributed extensible blockchain structures, according to various embodiments.

Referring now to FIG. 4, a block diagram of a DEBS 400 is shown, according to an example embodiment. As shown in FIG. 4, the DEBS 400 includes a parent blockchain 402 with various blocks. The blocks of the parent blockchain 402 include a block 404 ("Block P(N)"), a block 406 that precedes block 404 ("Block P(N−1)"), and a block 408 that follows block 404 ("Block P(N+1)"). FIG. 4 also includes a block diagram 410 of the structure of Block P(N) in greater detail. In the embodiment of FIG. 4, the block diagram 410 is similar to the SignedData block 200 shown in FIG. 2, though it should be understood that in other embodiments, Block P(N) may be structured in a different manner that accomplishes the same functions described herein. Block P(N) includes content 412 (termed "Content P(N)" in FIG. 4), as well as a first value 414 (termed "Signerinfo(0)" in FIG. 4) and a second value 416 (termed "Signerinfo(1)" in FIG. 4). Signerinfo(0) and Signerinfo(1) each include an attribute with a hash and a pointer (termed "precedingBlock" for Signerinfo(0) and "associatedBlock" for Signerinfo(1) in FIG. 4).

As shown, the hash for Signerinfo(0) is of Block P(N−1) (e.g., a hash of the content of Block P(N−1)), and the pointer for Signerinfo(0) indicates Block P(N−1) (e.g., a pointer identifying the location of Block P(N−1)). Accordingly, as further indicated by the dotted arrow in FIG. 4, Signerinfo (0) identifies that the preceding block for Block P(N) is Block P(N−1). Similarly, the hash for Signerinfo(1) is of Block P(N+1) (e.g., a hash of the content of Block P(N+1)), and the pointer for Signerinfo(1) indicates Block P(N+1) (e.g., a pointer identifying the location of Block P(N+1)). As such, as shown by the dotted arrow in FIG. 4, Signerinfo(1) identifies that Block P(N+1) is associated with Block P(N). In the embodiment of FIG. 4, the associatedBlock attribute for Block P(N) acts as a mechanism for indicating the subsequent block in the parent blockchain 402. However, it should be understood that in other embodiments, the associatedBlock may be used to indicate any block with content associated with Block P(N), such as a non-sequential block in the parent blockchain 502. As an example, the parent blockchain 502 may include a block that follows Block P(N+1) (e.g., "Block P(N+2)"), and Signerinfo(0)' may instead identify that Block P(N) is associated with Block P(N+2). Alternatively, in some embodiments, Block P(N) may not be associated with any non-sequential blocks and thus only include Signerinfo(0) indicating the preceeding block for Block P(N). Furthermore, although not shown in FIG. 4, in various embodiments, Block P(N−1) includes a similar value indicating that Block P(N) follows Block P(N−1), and Block P(N+1) includes a value indicating that Block P(N) precedes Block P(N+1). In this way, the blocks of the parent blockchain 402 are interconnected.

Alternatively, in some embodiments, Block P(N) is the first block in blockchain 402. In such embodiments, Block P(N) still includes Signerinfo(1) indicating the next block or an associated block in the blockchain 402, as described above. However, Signerinfo(0) is modified to indicate that Block P(N) is the first block. For example, Signerinfo(0) may not include a precedingBlock attribute, thereby indicating that Block P(N) is the first block in the blockchain 402. As another example, the hash in the precedingBlock attribute may be zero, which indicates that Block P(N) is the first block in the blockchain 402. As a third example, Signerinfo(0) may include an attribute (e.g., a "firstBlock" attribute) signaling that different processing is needed for Block P(N) because Block P(N) is the first block in the blockchain 402.

Figure 5:
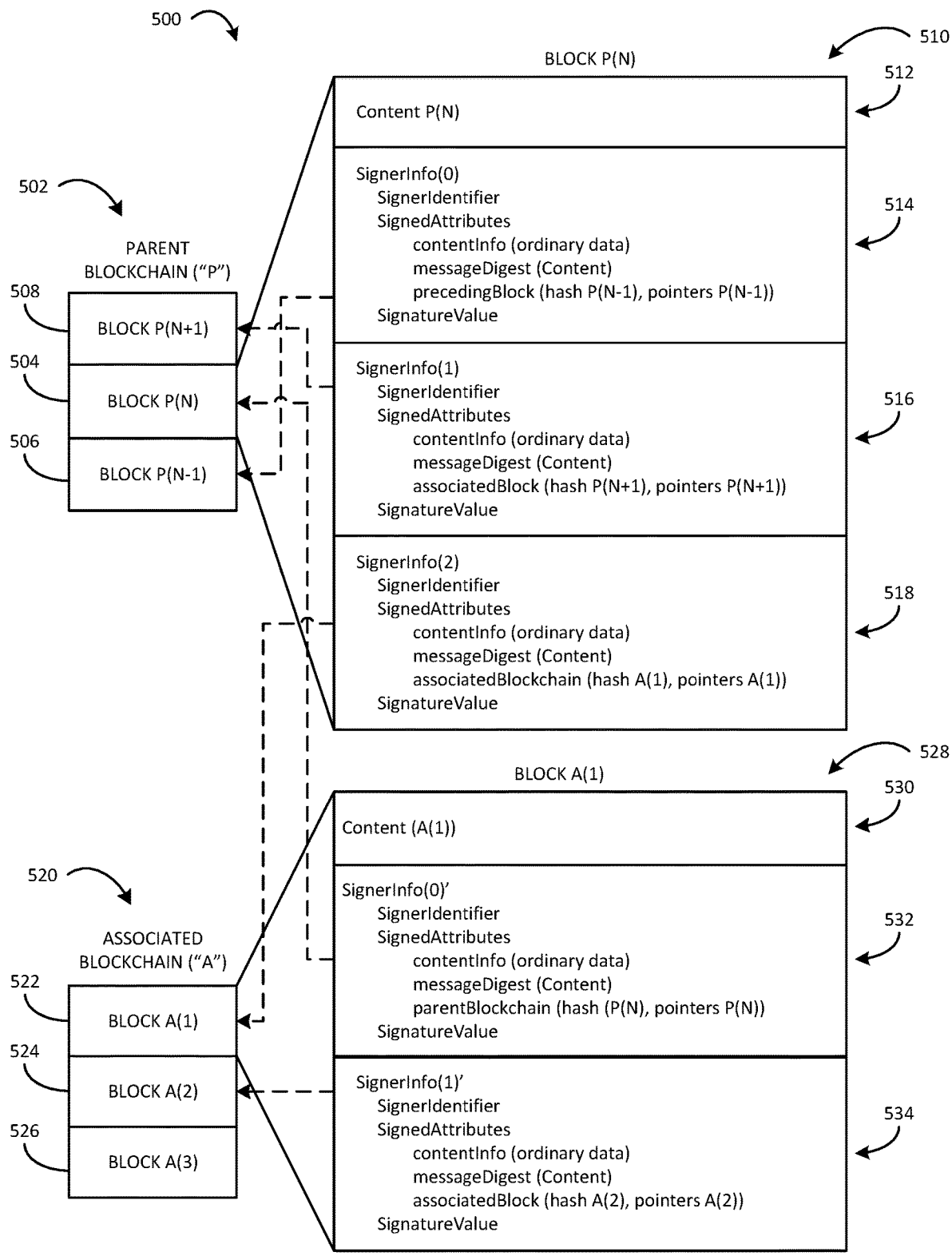

Referring now to FIG. 5, a block diagram of a DEBS 500 is shown, according to another example embodiment. As shown in FIG. 5, the DEBS 500 includes a parent blockchain 502 with various blocks, as well as an associated blockchain 520 with various blocks. Similar to the parent blockchain 402, the blocks of the parent blockchain 502 include a block 504 ("Block P(N)"), a block 506 that precedes block 504 ("Block P(N−1)"), and a block 508 that follows block 504 ("Block P(N+1)"). FIG. 5 also includes a block diagram 510 of the structure of Block P(N) in greater detail. In the embodiment of FIG. 5, the block diagram 510 is similar to the block diagram 410 shown in FIG. 4, including content 512 (termed "Content P(N)" in FIG. 5), a first value 514 (termed "Signerinfo(0)" in FIG. 5) that identifies Block P(N−1) as the preceding block for Block P(N), and a second value 516 (termed "Signerinfo(1)" in FIG. 5) that identifies Block P(N+1) as the proceeding block for Block P(N). However, in FIG. 5, Block P(N) also includes a third value 518 (termed "SignerInfo(2)" in FIG. 5). Similar to Signerinfo(0) and Signerinfo(1), Signerinfo(2) includes an attribute with a hash and a pointer (termed "associatedBlock-chain" in FIG. 5), but rather than identifying another block on the parent blockchain 502, associatedBlockchain identifies the associated blockchain 520 (e.g., because the associated blockchain 520 includes content associated with Block P(N)).

More specifically, associated blockchain 520 includes a first block 522 (termed "Block A(1)" in FIG. 5), a second block 524 (termed "Block A(2)" in FIG. 5), and a third block 526 (termed "Block A(3)" in FIG. 5), though it should be understood that in various embodiments, the associated blockchain 520 may include any number of blocks. Accordingly, the hash for Signerinfo(2) is of Block A(1) of the associated blockchain 520 (e.g., a hash of content 530 of Block A(1)), and the pointer for Signerinfo(2) indicates Block A(1) (e.g., a pointer identifying the location of Block A(1)). Signerinfo(2) thus identifies that Block P(N) is associated with Block A(1) and, by extension, the entire associated blockchain 520.

Similarly, FIG. 5 includes a block diagram 528 of the structure of Block A(1) in greater detail. In the embodiment of FIG. 5, the block diagram 528 is similar to the SignedData block 200 shown in FIG. 2, as well as the block diagram 510 for Block P(N), though it should be understood that in other embodiments, Block A(1) may be structured in a different manner that accomplishes the same functions described herein. Further, it should be understood that the blocks of the associated blockchain 520 may be structured differently from the blocks of the parent blockchain 502. Block A(1) includes content 530 (termed "Content A(1)" in FIG. 5), as well as a first value 532 (termed "Signerinfo(0)'" in FIG. 5) and a second value 534 (termed Signerinfo(1)'" in FIG. 5). Signerinfo(0)' and Signerinfo(1)' each include an attribute with a hash and a pointer (termed "parentBlockchain" for Signerinfo(0)' and "associatedBlock" for Signerinfo(1)'). The associatedBlock attribute is configured similarly to the associatedBlock attribute of Signerinfo(1), including a hash of Block A(2) and a pointer to Block A(2), and accordingly Signerinfo(1)' identifies Block A(2) as an associated block (e.g., the subsequent block) for Block A(1). Additionally, Signerinfo(0)' includes a hash of Block P(N) (e.g., a hash of the content 512 of Block P(N)) and a pointer to Block P(N) (e.g., a pointer identifying the location of Block P(N)). As such, Signerinfo(0)' identifies that Block A(1), and by extension the entirety of the associated blockchain 520, is associated with Block P(N). Block P(N) and the associated blockchain 520 are thus interconnected through Signerinfo (2) and Signerinfo(0)'.

Alternatively, in other embodiments, rather than a given block of a parent blockchain being associated with the entirety of another blockchain, the given block may be associated with content of a single block of another blockchain. For example, Signerinfo(0)' may instead identify just Block A(3) of the associated blockchain 520 as being associated with Block P(N).

Figure 6A:
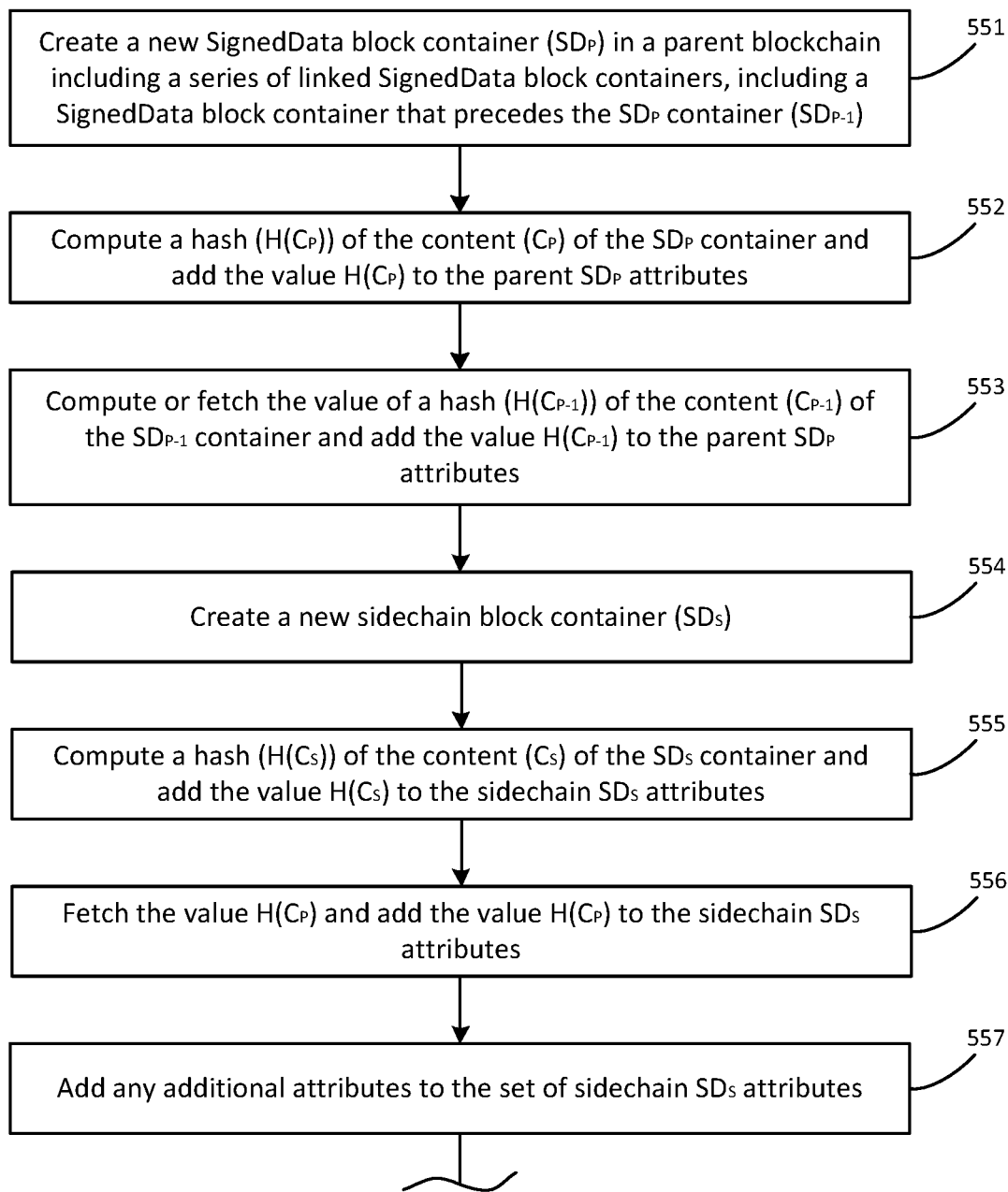
FIGS. 6A-6B and 7A-7B are flow diagrams showing processes of implementing a sidechain using a distributed extensible blockchain structure, according to various embodiments.
Figure 6B:
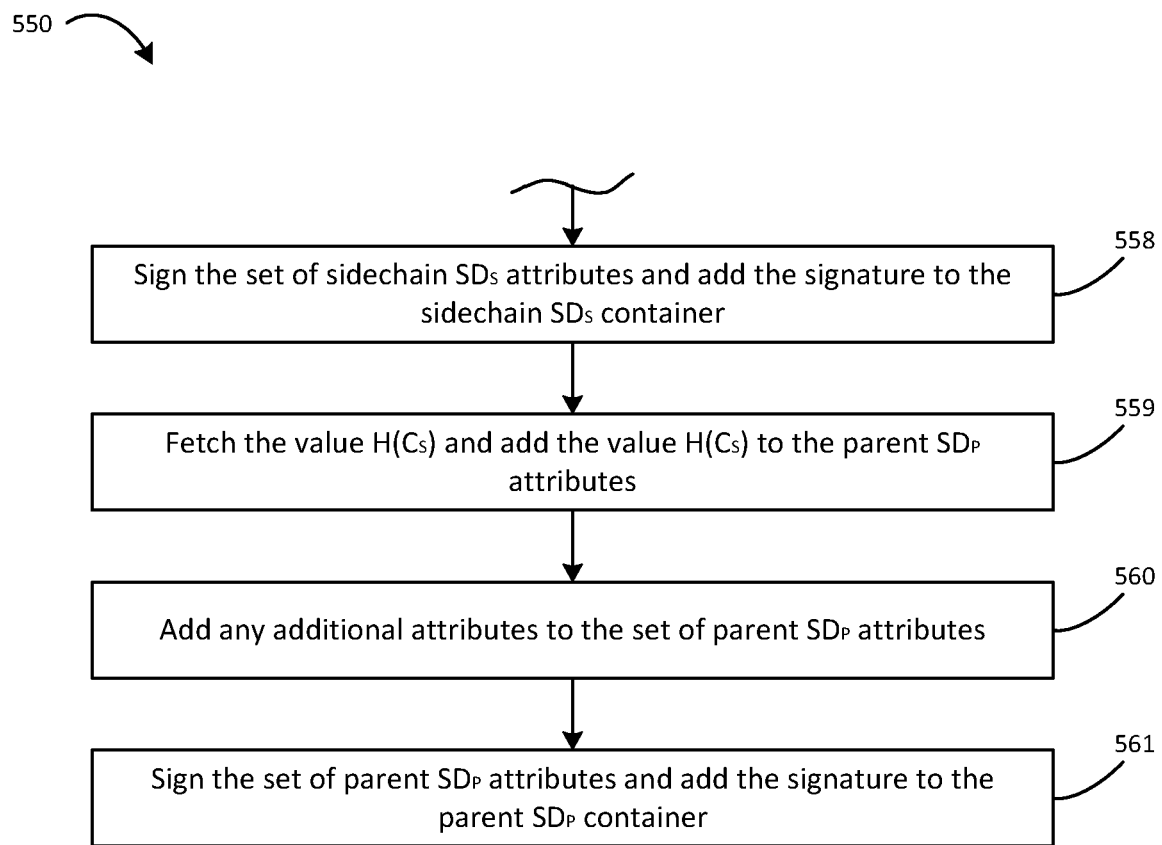

An associated blockchain, such as a sidechain or a parallel blockchain, may be linked to a parent blockchain through one of several processes. As an illustration, referring now to FIGS. 6A and 6B, a flow diagram of a method 550 of implementing a sidechain using DEBS is shown, according to one example embodiment. Method 550 is tightly coupled to a signed hash that links the content of a block to a preceding blockchain block and to a sidechain block such that the link to the sidechain cannot be removed without invalidating the signature on the parent block. As such, method 550 must be performed at the time the block is created and before the hash-link is signed.

At step 551, a new SignedData block container (e.g., termed "SD$_P$") is created in a parent blockchain, the parent blockchain including a series of linked SignedData block containers. The SignedData block containers of the parent blockchain include a SignedData block container that precedes the SD$_P$ container in the blockchain (e.g., termed "SD$_{P-1}$"). Each of the SignedData block containers includes content (e.g., termed "C$_P$" for the SD$_P$ container and "C$_{P-1}$" for the SD$_{P-1}$ container, which may be stored in a contentInfo attribute of its respective container).

At step 552, a hash (e.g., termed "H(C$_P$)") of the C$_P$ content is computed. The value H(C$_P$) is added to the SD$_P$ container. As an example, the value H(C$_P$) is added to a messageDigest attribute in the SD$_P$ container. Similarly, at step 553, a hash (e.g., termed "H(C$_{P-1}$)") of the C$_{P-1}$ content is computed or fetched. The value H(C$_{P-1}$) is then added to the SD$_P$ container. For example, the value H(C$_{P-1}$) is added to a precedingBlock attribute in the SD$_P$ container.

At step 554, a new sidechain block container (e.g., termed "SD$_S$") is created. The SD$_S$ container also includes content (e.g., termed "C$_S$" and stored in a contentInfo attribute of the SD$_S$ container). At step 555, a hash (e.g., termed "H(C$_S$)") of the C$_S$ content is computed, and the value H(C$_S$) is added to the SD$_S$ container. As an example, the value H(C$_S$) is added to a messageDigest attribute for the SD$_S$ container. At step 556, the value H(C$_P$) is fetched and also added to the sidechain SD$_S$ attributes, such as in a precedingBlock attribute in the SD$_S$ container. Further, at step 557, any additional desired attributes are added to the set of sidechain SD$_S$ attributes. For example, a pointer indicating the location of the SD$_P$ container may be added to the set of sidechain SD$_S$ attributes.

At step 558, the set of sidechain SD$_S$ attributes is signed, and the signature is added to the sidechain SD$_S$ container. For example, the value H(C$_S$), value H(C$_P$), and any other desired attributes (e.g., a pointer indicating the location of the SD$_P$ container) are added to a SignedAttributes element of the SD$_S$. The SignedAttributes element is signed (e.g., with a signer's private key in a private/public key pair), and the signature is stored in a SignatureValue element of the SD$_S$ container. Signing the sidechain SD$_S$ attributes in this way hash-links the sidechain to the parent blockchain.

At step 559, the value H(C$_S$) is fetched and added to the parent SD$_P$ attributes, such as in an associatedBlock attribute of the SD$_P$ container. At step 560, any additional attributes are added to the set of parent SD$_P$ attributes. As an example, a pointer indicating the location of the SD$_S$ container and a pointer indicating the location of the SD$_{P-1}$ container are added to the set of parent SD$_P$ attributes.

Finally, at step 561, the set of parent SD$_P$ attributes is signed, and the signature is added to the parent SD$_P$ container. For example, similar to step 558, the value H(C$_P$), value H(C$_{P-1}$), value H(C$_S$), and any other desired attributes (e.g., pointers indicating the locations of the SD$_S$ and SD$_{P-1}$ containers) are added to a SignedAttributes element of the SD$_P$. The SignedAttributes element is then signed (e.g., with a signer's private key in a private/public key pair), and the signature is stored in a SignatureValue element of the SD$_P$ container. Signing the parent SD$_P$ attributes in this way hash-links the SD$_P$ container block to the preceding SD$_{P-1}$ container block and to the sidechain SD$_S$ container block. Thus, the SD$_P$ container and the SD$_S$ container are cryptographically doubly linked together via digital signatures, not only at the container level, but at the blockchain block level.

Figure 7A:
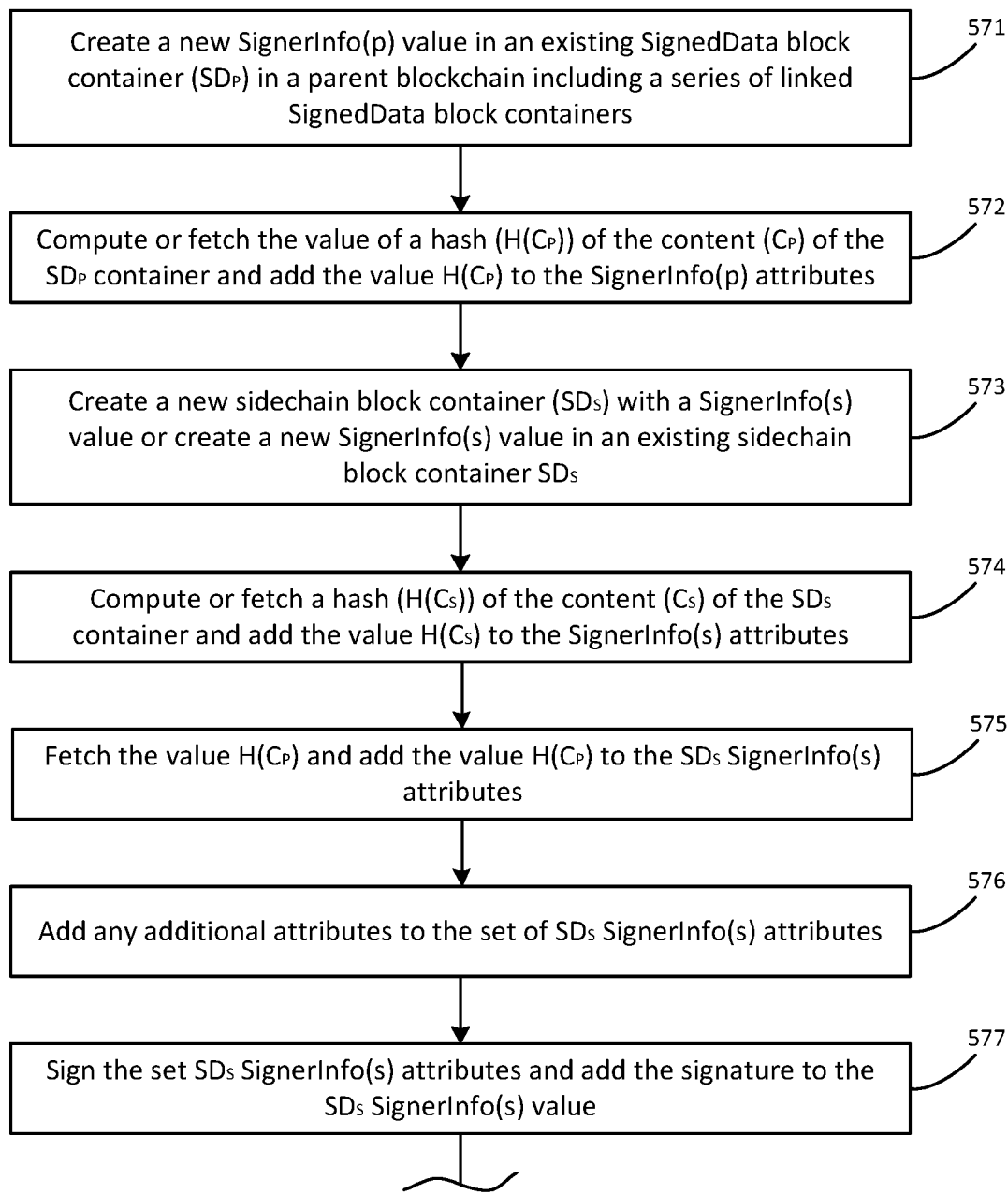
Figure 7B:
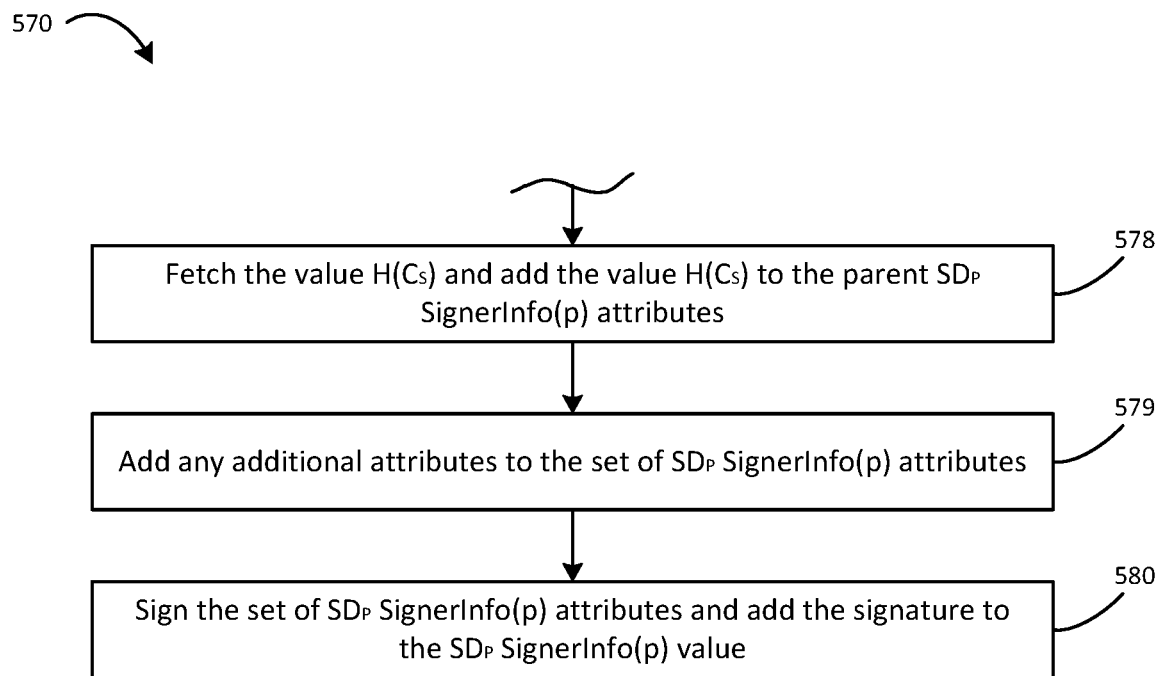

As another illustration, referring now to FIGS. 7A and 7B, a flow diagram of a method 570 of implementing a sidechain using DEBS is shown, according to another example embodiment. Unlike method 550, method 570 is loosely coupled to a SignedData container's hash-linked blockchain. As such, method 570 may be performed at any time after the block content has been hash-linked to a blockchain and signed and may further be added or removed at any time without compromising the signed, hash-linked parent blockchain. Moreover, method 570 allows for the a block in the parent blockchain and an associated sidechain to be created by different signers, with each signer selecting the set of attributes, the choice of hash and signature algorithms, and the same or different signing keys.

At step 571, a new Signerinfo(p) value is created in in an existing SD$_P$ container in a parent blockchain, where the parent blockchain includes a series of linked SignedData block containers. At step 572, the value H(C$_P$) of the content C$_P$ is computed or fetched and added to the Signerinfo(p) attributes in the SD$_P$ container. For example, the value H(C$_P$) is added to a messageDigest attribute of the Signerinfo(p) value.

Next, at step 573, a new sidechain block container SD$_S$ with a Signerinfo(s) value is created. Alternatively, a new Signerinfo(s) value in an existing sidechain block container SD$_S$ is created. At step 574, a value H(C$_S$) of the content C$_S$ of the SD$_S$ container is created and added to the Signerinfo(s) attributes. As an example, the value H(C$_S$) is added to a messageDigest attribute of the Signerinfo(s) value. At step 575, the value H(C$_P$) is fetched and also added to the SD$_S$ Signerinfo(s) attributes, such as to a precedingBlock attribute of the Signerinfo(s) value. At step 576, any additional attributes are added to the set of SD$_S$ Signerinfo(s) attributes. For example, a pointer indicating the location of the SD$_P$ container is added to the set of Signerinfo(s) attributes.

At step 577, the set of SD$_S$ Signerinfo(s) attributes are signed, and the signature is added to the SD$_S$ Signerinfo(s) value. In various arrangements, signing the Signerinfo(s) attributes occurs similarly to step 558 of method 550, discussed above. Signing the SD$_S$ Signerinfo(s) attributes hash-links the sidechain to the parent blockchain.

Next, at step 578, the value H(C$_S$) is fetched and added to the parent SD$_P$ Signerinfo(p) attributes. For example, the value H(C$_S$) is added to an associatedBlock attribute of the Signerinfo(p) value. At step 579, any additional attributes are added to the set of SD$_P$ Signerinfo(p) attributes, such as a pointer indicating the location of the SD$_S$ container.

Finally, at step 580, the set of SD$_P$ Signerinfo(p) attributes is signed, and the signature is added to the SD$_P$ Signerinfo(p) value. In various arrangements, signing the Signerinfo(p) attributes occurs similarly to step 561 of method 550, discussed above. Signing the SD$_S$ Signerinfo(p) attributes doubly hash-links the SD$_P$ container block to the sidechain SD$_S$ container block.

It should be understood that methods 550 and 570 may also be applied to other types of blockchains, such as parallel blockchains, that are associated with a parent blockchain. Additionally, in various embodiments, methods 550 and 570 may include adding elements or attributes not discussed above with reference to FIGS. 6A-6B and 7A-7B. As an illustration, information about the signer, such as the signer's public key corresponding to the private key, may also be included in the SD$_S$ and SD$_P$ containers (e.g., in a SignerIdentifier element). Furthermore, at least some of the steps may be performed in a different order than discussed above. For example, in some arrangements, the SD$_P$ attributes may be signed before the SD$_S$ attributes.

Figure 8:
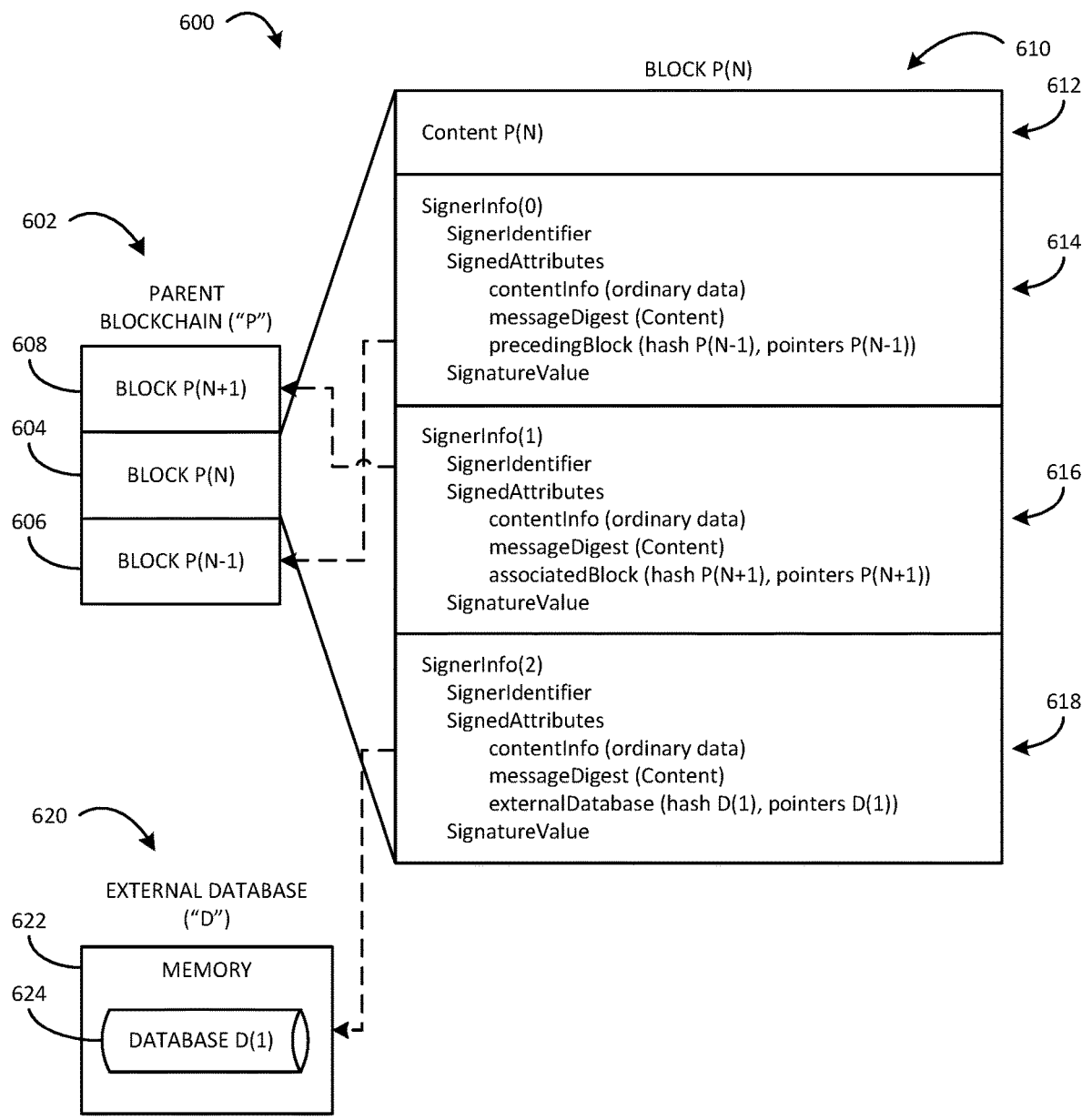
FIG. 8 is a block diagram of a distributed extensible blockchain structure, according to one embodiment.

Referring now to FIG. 8, a block diagram of a DEBS 600 is shown, according to an example embodiment. As shown in FIG. 8, the DEBS 600 includes a parent blockchain 602 with various blocks, as well as an external database 620. Similar to the parent blockchain 402 and the parent blockchain 502, the blocks of the parent blockchain 602 include a block 604 ("Block P(N)"), a block 606 that precedes block 604 ("Block P(N−1)"), and a block 608 that follows block 604 ("Block P(N+1)"). FIG. 8 also includes a block diagram 610 of the structure of Block P(N) in greater detail. In the embodiment of FIG. 8, the block diagram 610 is similar to the block diagram 510 shown in FIG. 5. Accordingly, the block diagram 610 includes content 612 (termed "Content P(N) in FIG. 8"), a first value 614 (termed "SignerInfo(0)" in FIG. 8) that identifies Block P(N−1) as the preceding block for Block P(N), a second value 616 (termed "Signerinfo(2)" in FIG. 8) that identifies Block P(N+!) as the proceeding block for Block P(N), and a third value 518 (termed "Signerinfo(2)" in FIG. 8).

However, rather than identify a blockchain associated with Block P(N), in the embodiment of FIG. 8, Signerinfo(2) identifies that Block P(N) is associated with content stored in the external database 620. As shown in FIG. 8, the external database 620 includes a memory 622 with a database 624 (termed "Database D(1)" in FIG. 8). As such, Signerinfo(2) includes an attribute with a hash and a pointer (termed "externalDatabase" in FIG. 8), where the hash is of Database D(1) (e.g., a hash of some or all of the content stored in Database D(1)) and the pointer identifies the location of Database D(1) (e.g., identifies the location of the memory 622, the location of Database D(1) within the memory 622, and the location of the desired content within Database D(1)). Additionally, in some embodiments, the Database D(1) may include a hash and/or a pointer identifying that the desired content is associated with Block P(N). In this way, Database D(1) and Block P(N) may be interconnected. Further, in various arrangements, Signerinfo(2) may identify that Block P(N) is associated with a different external item. For example, SignerInfo(2) may identify an item stored in an IoT device, an item stored in a cloud server, a physical item stored in a physical location, and so on.

It should also be understood that FIGS. 4-6 are intended to be illustrative rather than limiting. Accordingly, various functions of the DEBS 400, 500, and/or 600 may be implemented as a single DEBS. For example, a DEBS may include various blocks in a parent blockchain. Each block of the parent blockchain may identify the preceding block and the proceeding block with an attribute including a hash and a pointer as illustrated in FIG. 4. Additionally, various blocks of the parent blockchain may be associated with other blockchains and/or specific blocks of other blockchains, and each of these various blocks may identify the association with a hash and a pointer as illustrated in FIG. 5. Further, various blocks of the parent blockchain may be associated with external content, such as information stored in an external database, an IoT device, a physical location, and so on. As such, each of these various blocks of the parent blockchain may identify the association with a hash and a pointer as illustrated in FIG. 8. Thus, a single block of the parent blockchain may include multiple SignerInfo values, with one SignerInfo value indicating the preceding block of the parent blockchain, one SignerInfo value indicating the proceeding block of the parent blockchain, one SignerInfo value indicating an associated blockchain, one SignerInfo value indicating a particular block on an associated blockchain, one SignerInfo value indicating an external content item, and so on.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include machine or computer-readable media that are executable by one or more processors (e.g., multiple remote processors connected to each other through any type of network). The machine-readable media may include code, which may be written in any programming language, including, but not limited to, Java or the like and any conventional procedural programming languages, such as the "C" programming language or similar programming languages. Alternatively, the term "circuit" may include hardware structured to execute the functions described herein, and in some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, or XNOR), resistors, multiplexers, registers, capacitors, inductors, diodes, wiring, and so on. Thus, a circuit may also include programmable hardware devices such as field programmable gate arrays, programmable array logic programmable logic devices, or the like.

In other embodiments, the "circuit" includes one or more processors communicably coupled to one or more memories or memory devices. In this regard, the one or more processors execute instructions stored in the memory or execute instructions otherwise accessible to the one or more processors. In various arrangements, the one or more processors are embodied in various ways and are constructed in a manner sufficient to perform at least the operations described herein. In some embodiments, the one or more processors are shared by multiple circuits (e.g., circuit A and circuit B comprise or otherwise share the same processor which, in some example embodiments, executes instructions stored, or otherwise accessed, via different areas of memory). Additionally, in various arrangements, a given circuit or components thereof (e.g., the one or more processors) are disposed locally (e.g., as part of a local server or a local computing system) or remotely (e.g., as part of a remote server such as a cloud based server). To that end, in certain arrangements, a "circuit" as described herein includes components that are distributed across one or more locations.

As used herein, a processor is implemented as a general-purpose processor, an application specific integrated circuit (ASIC), one or more field programmable gate arrays (FPGAs), a digital signal processor (DSP), a group of processing components, or other suitable electronic processing components. Additionally, in some arrangements, a "processor," as used herein, is implemented as one or more processors. In certain embodiments, the one or more processors are structured to perform or otherwise execute certain operations independent of one or more co-processors. In other example embodiments, two or more processors are coupled via a bus to enable independent, parallel, pipelined, or multi-threaded instruction execution. In some arrangements, the one or more processors take the form of a single core processor, multi-core processor (e.g., a dual core processor, triple core processor, or quad core processor), microprocessor, and the like. In some embodiments, the one or more processors are external to the apparatus, for example, the one or more processors are a remote processor (e.g., a cloud based processor). Alternatively, or additionally, the one or more processors are internal and/or local to the apparatus. Accordingly, an exemplary system for implementing the overall system or portions of the embodiments might include a general purpose computing computers in the form of computers, including a processing unit, a system memory, and a system bus that couples various system components including the system memory to the processing unit.

Additionally, as used herein, a memory includes one or more memory devices including non-transient volatile storage media, non-volatile storage media, non-transitory storage media (e.g., one or more volatile and/or non-volatile memories), and the like. In some embodiments, the non-volatile media takes the form of ROM, flash memory (e.g., flash memory such as NAND, 3D NAND, NOR, or 3D NOR), EEPROM, MRAM, magnetic storage, hard discs, optical discs, and the like. In some embodiments, the volatile storage media takes the form of RAM, TRAM, ZRAM, and the like. Combinations of the above are also included within the scope of machine-readable media. In this regard, machine-executable instructions comprise, for example, instructions and data which cause a general purpose computer, special purpose computer, or special purpose processing machines to perform a certain function or group of functions. In various arrangements, each respective memory device is operable to maintain or otherwise store information relating to the operations performed by one or more associated circuits, including processor instructions and related data (e.g., database components, object code components, or script components), in accordance with the example embodiments described herein.

It should be understood that a "network interface," as used herein, is structured to communicate data over a network (e.g., the network 108) includes any of a cellular transceiver (Code Division Multiple Access (CDMA), Global System for Mobile Communications (GSM), Long-Term Evolution (LTE), etc.), a wireless network transceiver (e.g., 802.11X, ZigBee, or Bluetooth), or a combination thereof (e.g., both a cellular transceiver and a Bluetooth transceiver). In some arrangements, a network interface includes hardware and machine-readable media sufficient to support communication over multiple channels of data communication. Further, in some arrangements, the network interface includes cryptography capabilities to establish a secure or relatively secure communication session between the device including the network interface and other devices of the system 100 via the network 108. In this regard, personal information about clients, financial data, and other types of data is encrypted and transmitted to prevent or substantially prevent the threat of hacking.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques, with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system, comprising:
    a parent blockchain, comprising:
        a first block comprising first content, the first block stored at a first location; and
        a second block stored at a second location different than the first location, the second block comprising:
            second content, and
            a first SignerInfo element, comprising:
                a hash of the second content,
                a hash of the first content of the first block, and
                a pointer to the first location of the first block;
    a memory; and
    a processor configured to generate a first SignatureValue element generated by digitally signing at least the hash on the second content, the hash on the first content, and the pointer to the first location,
        wherein the first and second blocks are each structured as a SignedData cryptographic message, and wherein any number of external blockchains are configured to be added or removed from the second block without invalidating the hashes on the first and second content.

2. The system of claim 1, wherein the first block further comprises:
a second SignerInfo element, comprising:
a hash of the first content of the first block,
a hash of the second content of the second block,
a pointer to the second location of the second block,
the first SignerInfo element, and
a second SignatureValue element generated by digitally signing at least the hash on the first content, the hash on the second content, the pointer to the second location, and the first SignerInfo element in the second SignerInfo element.

3. The system of claim 1, further comprising:
a first associated blockchain comprising a first associated block, the first associated block comprising:
first associated content; and
a third SignerInfo element, comprising:
a hash of the first associated content,
a hash of the second content of the second block,
a pointer to the second location of the second block of the parent blockchain, and
a third SignatureValue element generated by digitally signing at least the hash on the first associated content, the hash on the second content, and the pointer to the second location in the third SignerInfo element.

4. The system of claim 3, wherein the second block further includes:
a fourth SignerInfo element, comprising:
a hash of the second content;
a hash of the first associated content of the first associated block in the first associated blockchain;
a pointer to a location of the first associated block; and
a fourth SignatureValue element generated by digitally signing at least the hash of the second content, the hash on the first associated content, and the pointer to the location of the first associated block in the fourth SignerInfo element.

5. The system of claim 4, wherein the fourth Signerinfo element of the second block of the parent blockchain further comprises:
a second SignerIdentifier element identifying a second public key; and
a second SignedAttributes element, including:
a contentInfo element including the second content,
a messageDigest element including the hash of the second content, and
an associatedBlockchain element including the hash of the first associated content of the first associated block in the first associated blockchain and the pointer to the location of the first associated block;
wherein the fourth SignatureValue element is generated by digitally signing the second SignedAttributes element with a second private key, a second key pair including the second public key and the second private key.

6. The system of claim 3, wherein the first SignerInfo element of the second block further comprises:
a hash of the first associated content of the first associated block in the first associated blockchain; and
a pointer to a location of the first associated block;
wherein the first SignatureValue element is generated by digitally signing at least the hash on the second content, the hash on the first content, the hash on the first associated content, the pointer to the first location, and the pointer to the location of the first associated block in the first Signerinfo element.

7. The system of claim 3, wherein the first associated block is configured to be deleted without invalidating the hash of the second content and the hash of the first content in the first Signerinfo element.

8. The system of claim 1, wherein the first Signerinfo element of the second block of the parent blockchain further comprises:
a first SignerIdentifier element identifying a first public key; and
a first SignedAttributes element, including:
a contentInfo element including the second content,
a messageDigest element including the hash of the second content, and
a precedingBlock element including the hash of the first content of the first block, the first block immediately preceding the second block in the parent blockchain, and the pointer to the first location of the first block;
wherein the first SignatureValue element is generated by digitally signing the first SignedAttributes element with a first private key, a first key pair including the first public key and the first private key.

9. The system of claim 1,
wherein the first location is a first distributed ledger, and
wherein the second location is a second distributed ledger different than the first distributed ledger.

10. The system of claim 1, wherein the second block further includes:
a fifth Signerinfo element, comprising:
a hash of the second content,
a hash of first associated content located in an external database;
a pointer to a location of the first associated content in the external database, and
a fifth SignatureValue element generated by digitally signing at least the hash on the second content, the hash on the first associated content, and the pointer to the location of the first associated content in the fifth Signerinfo element.

11. The system of claim 1, wherein the second block further includes:
a sixth Signerinfo element, comprising:
a hash of the second content,
a hash of first associated content, wherein the first associated content corresponds with external content located in a separate physical location,
a pointer to the physical location of the first associated content, and
a sixth SignatureValue element generated by digitally signing at least the hash on the second content, the hash on the first associated content, and the pointer to the physical location of the first associated content in the sixth Signerinfo element.

12. The system of claim 11, wherein the pointer to the physical location of the first associated content comprises geographic coordinates for the physical location.

13. The system of claim 11, wherein pointer to the physical location of the first associated content comprises a plurality of locator values.

14. The system of claim 1, further comprising:
a third block stored at the second location, the third block comprising:
 third content, and
 a seventh Signerinfo element, comprising:
  a hash of the third content,
  a hash of the second content of the second block, and
  a seventh SignatureValue element generated by digitally signing at least the hash on the third content and the hash on the second content in the seventh Signerinfo element.

15. The system of claim 1, wherein the first Signerinfo element of the second block further comprises:
a Signerinfo attribute, wherein a payload of the Signerinfo attribute is an eighth Signerinfo element comprising:
 the hash of the second content,
 the hash of the first content of the first block,
 the pointer to the first location of the first block, and
 an eighth SignatureValue element generated by digitally signing at least the hash on the second content, the hash on the first content, and the pointer to the first location in the eighth SignatureValue element, wherein the eighth SignatureValue element is signed using a quantum algorithm.

16. A method, comprising:
providing a parent blockchain, comprising:
 providing a first block comprising first content, the first block stored at a first location; and
 providing a second block stored at a second location different than the first location, the second block comprising:
  second content,
  a first SignerInfo element, comprising:
   a hash of the second content,
   a hash of the first content of the first block,
   a pointer to the first location of the first block, and
   a first SignatureValue element generated by digitally signing at least the hash on the second content, the hash on the first content, and the pointer to the first location,
  wherein the first and second blocks are each structured as a SignedData cryptographic message, and
  wherein any number of external blockchains are configured to be added or removed from the second block without invalidating the hashes on the first and second content.

17. The method of claim 16, wherein the first block further comprises:
a second SignerInfo element, comprising:
 a hash of the first content of the first block,
 a hash of the second content of the second block,
 a pointer to the second location of the second block,
 the first SignerInfo element, and
 a second SignatureValue element generated by digitally signing at least the hash on the first content, the hash on the second content, the pointer to the second location, and the first SignerInfo element in the second SignerInfo element.

18. The method of claim 16, further comprising:
providing a first associated blockchain comprising a first associated block, the first associated block comprising:
 first associated content, and
 a third SignerInfo element, comprising:
  a hash of the first associated content,
  a hash of the second content of the second block,
  a pointer to the second location of the second block of the parent blockchain, and
  a third SignatureValue element generated by digitally signing at least the hash on the first associated content, the hash on the second content, and the pointer to the second location in the third SignerInfo element.

19. The method of claim 18, further comprising:
amending the second block to further include:
 a fourth SignerInfo element, comprising:
  a hash of the second content,
  a hash of first associated content of a first associated block in a first associated blockchain,
  a pointer to a location of the first associated block, and
  a fourth SignatureValue element generated by digitally signing at least the hash on the second content, the hash on the first associated content, and the pointer to the location of the first associated block in the fourth SignerInfo element.

20. The method of claim 19, wherein the third SignerInfo element of the second block of the parent blockchain further comprises:
a second SignerIdentifier element identifying a second public key, and
a second SignedAttributes element, including:
 a contentInfo element including the second content,
 a messageDigest element including a hash of the second content, and
 an associatedBlockchain element including the hash of the first associated content of the first associated block in the first associated blockchain and the pointer to the location of the first associated block;
wherein the method further comprises generating the third SignatureValue element by digitally signing the SignedAttributes element with a second private key, a second key pair including the second public key and the second private key.

21. The method of claim 18, wherein the first SignerInfo element of the second block further comprises:
a hash of the first associated content of the first associated block in the first associated blockchain, and
a pointer to a location of the first associated block,
wherein the first SignatureValue element is generated by digitally signing at least the hash on the second content, the hash on the first content, the hash on the first associated content, the pointer to the first location, and the pointer to the location of the first associated block in the first SignerInfo element.

22. The method of claim 18, further comprising deleting the first associated block without invalidating the hash of the second content and the hash of the first content in the first SignerInfo element.

23. The method of claim 16, wherein the first SignerInfo element of the second block of the parent blockchain further comprises:
a first SignerIdentifier element identifying a first public key, and
a first SignedAttributes element, including:
 a contentInfo element including the second content,
 a messageDigest element including the hash of the second content, and
 a precedingBlock element including the hash of the first content of the first block, the first block immediately preceding the second block in the parent blockchain, and the pointer to the first location of the first block;

wherein the method further comprises generating the first SignatureValue element by digitally signing the first SignedAttributes element with a first private key, a first key pair including the first public key and the first private key.

24. The method of claim 16, wherein the first location is a first distributed ledger, and wherein the second location is a second distributed ledger different than the first distributed ledger.

25. The method of claim 16, further comprising amending the second block to further include:
  a fifth Signerinfo element, comprising:
    a hash of the second content,
    a hash of first associated content located in an external database,
    a pointer to a location of the first associated content in the external database, and
    a fifth SignatureValue element generated by digitally signing at least the hash of the second content, the hash of the first associated content, and the pointer to the location of the first associated content in the fifth Signerinfo element.

26. The method of claim 16, further comprising amending the second block to further include:
  a sixth SignerInfo element, comprising:
    a hash of the second content,
    a hash of first associated content, wherein the first associated content corresponds with external content located in a separate physical location,
    a pointer to the physical location of the first associated content, and
    a sixth SignatureValue element generated by digitally signing at least the hash on the second content, the hash on the first associated content, and the pointer to the physical location of the first associated content in the sixth SignerInfo element.

27. The method of claim 26, wherein the pointer to the physical location of the first associated content comprises geographic coordinates for the physical location.

28. The method of claim 26, wherein the pointer to the physical location of the first associated content comprises a plurality of locator values.

29. The method of claim 16, wherein providing the parent blockchain further comprises:
  providing a third block stored at the second location, the third block comprising:
    third content, and
    a seventh SignerInfo element, comprising:
      a hash of the third content,
      a hash of the second content of the second block, and
      a seventh SignatureValue element generated by digitally signing at least the hash on the third content and the hash on the second content in the seventh SignerInfo element.

30. The method of claim 16, wherein the first SignerInfo element of the second block further comprises:
  a SignerInfo attribute, wherein a payload of the SignerInfo attribute is an eighth SignerInfo element comprising:
    the hash of the second content,
    the hash of the first content of the first block,
    the pointer to the first location of the first block, and
    an eighth SignatureValue element generated by digitally signing at least the hash on the second content, the hash on the first content, and the pointer to the first location in the eighth SignatureValue element, wherein the eighth SignatureValue element is signed using a quantum algorithm.

31. A system, comprising:
  a parent blockchain, comprising:
    a first block comprising first content, the first block stored at a first location; and
    a second block stored at a second location different than the first location, the second block comprising:
      second content, and
      a first Signerinfo element, comprising:
        a hash of the second content,
        a hash of the first content of the first block, and
        a pointer to the first location of the first block;
  a memory; and
  a processor configured to generate a first SignatureValue element by digitally signing at least the hash on the second content, the hash on the first content, and the pointer to the first location;
  wherein the first block further comprises:
    a second Signerinfo element, comprising:
      a hash on the first content of the first block,
      a hash on the second content of the second block,
      a pointer to the second location of the second block,
      the first Signerinfo element, and
      a second SignatureValue element generated by digitally signing at least the hash on the first content, the hash on the second content, the pointer to the second location, and the first SignerInfo element in the second SignerInfo element;
  wherein the first and second blocks are each structured as a SignedData cryptographic message; and
  wherein any number of external blockchains are configured to be added or removed from at least one of the first block or the second block without invalidating the hashes on the first and second content.

* * * * *